United States Patent
Nanaumi

(10) Patent No.: US 12,401,895 B2
(45) Date of Patent: Aug. 26, 2025

(54) IMAGE CAPTURING APPARATUS, PROCESSING SYSTEM, AND CONTROL METHOD THAT DETERMINE, BASED ON A LOAD STATE, WHICH OF A DETACHABLE DEVICE AND AN EXTERNAL PROCESSING APPRARATUS IS TO BE USED TO PERFORM ANALYSIS PROCESSING

(71) Applicant: CANON KABUSHIKI KAISHA, Tokyo (JP)

(72) Inventor: Yoshihito Nanaumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 17/987,966

(22) Filed: Nov. 16, 2022

(65) Prior Publication Data

US 2023/0164431 A1 May 25, 2023

(30) Foreign Application Priority Data

Nov. 25, 2021 (JP) .................. 2021-191435

(51) Int. Cl.
*H04N 23/661* (2023.01)
*G06V 40/16* (2022.01)

(52) U.S. Cl.
CPC ......... *H04N 23/661* (2023.01); *G06V 40/161* (2022.01)

(58) Field of Classification Search
CPC ... H04N 23/661; H04N 23/663; G06V 40/161
(Continued)

(56) References Cited

U.S. PATENT DOCUMENTS

2008/0079836 A1* 4/2008 Nagata ................ H04N 23/663
 348/E5.025
2016/0127604 A1* 5/2016 Kawano ............. H04N 1/32475
 358/1.15

(Continued)

FOREIGN PATENT DOCUMENTS

JP 07184098 A 7/1995
JP 2012226583 * 11/2012 ............... G06T 7/20

(Continued)

OTHER PUBLICATIONS

Japanese Office Action issued Jul. 4, 2025, in Japanese Patent Application No. 2021-191435, with English translation (9 pages).

*Primary Examiner* — Lin Ye
*Assistant Examiner* — Chan T Nguyen
(74) *Attorney, Agent, or Firm* — Venable LLP

(57) ABSTRACT

An image capturing apparatus, having a detachable device executing analysis processing for image data obtained by image capturing, includes a processor and a memory storing instructions that, when executed, cause the apparatus to perform operations including communicating with an external processing apparatus capable of executing the analysis processing for the image data, obtaining load information concerning a load state in the external processing apparatus via the communicating, and determining which of the detachable device and the external processing apparatus is to be used to perform the analysis processing. The load state indicates a low load state in which the load state in the external processing apparatus is less than predetermined, a medium load state in which the load state is not less than the predetermined, but no waiting processing exists, or a high load state in which the load state is not less than the predetermined, and waiting processing exists.

11 Claims, 23 Drawing Sheets

(58) Field of Classification Search
USPC .................................................... 348/211.1
See application file for complete search history.

(56) References Cited

U.S. PATENT DOCUMENTS

| | | | | |
|---|---|---|---|---|
| 2017/0262240 A1* | 9/2017 | Osaki | .................... | G06F 3/1261 |
| 2022/0147604 A1* | 5/2022 | Ozono | .................... | G06F 21/45 |

FOREIGN PATENT DOCUMENTS

| | | | |
|---|---|---|---|
| JP | 2019219804 A | 12/2019 |
| JP | 2021048574 A | 3/2021 |
| WO | 2013145530 A | 10/2013 |

* cited by examiner

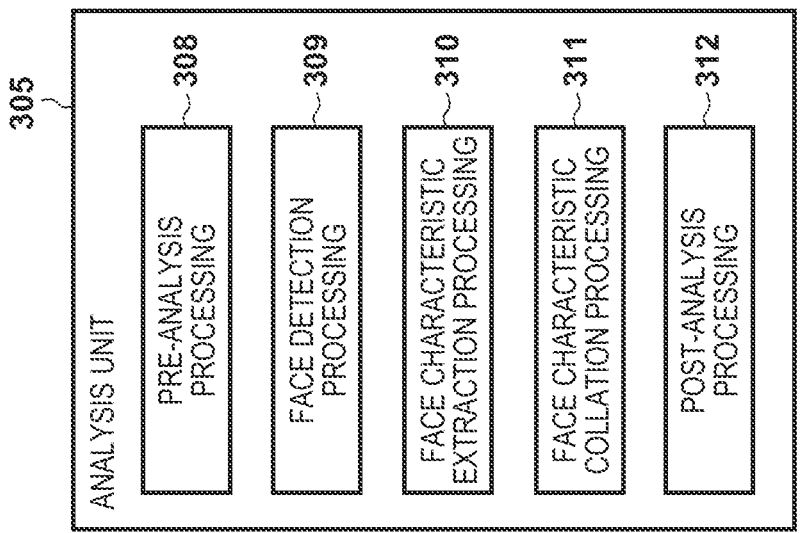
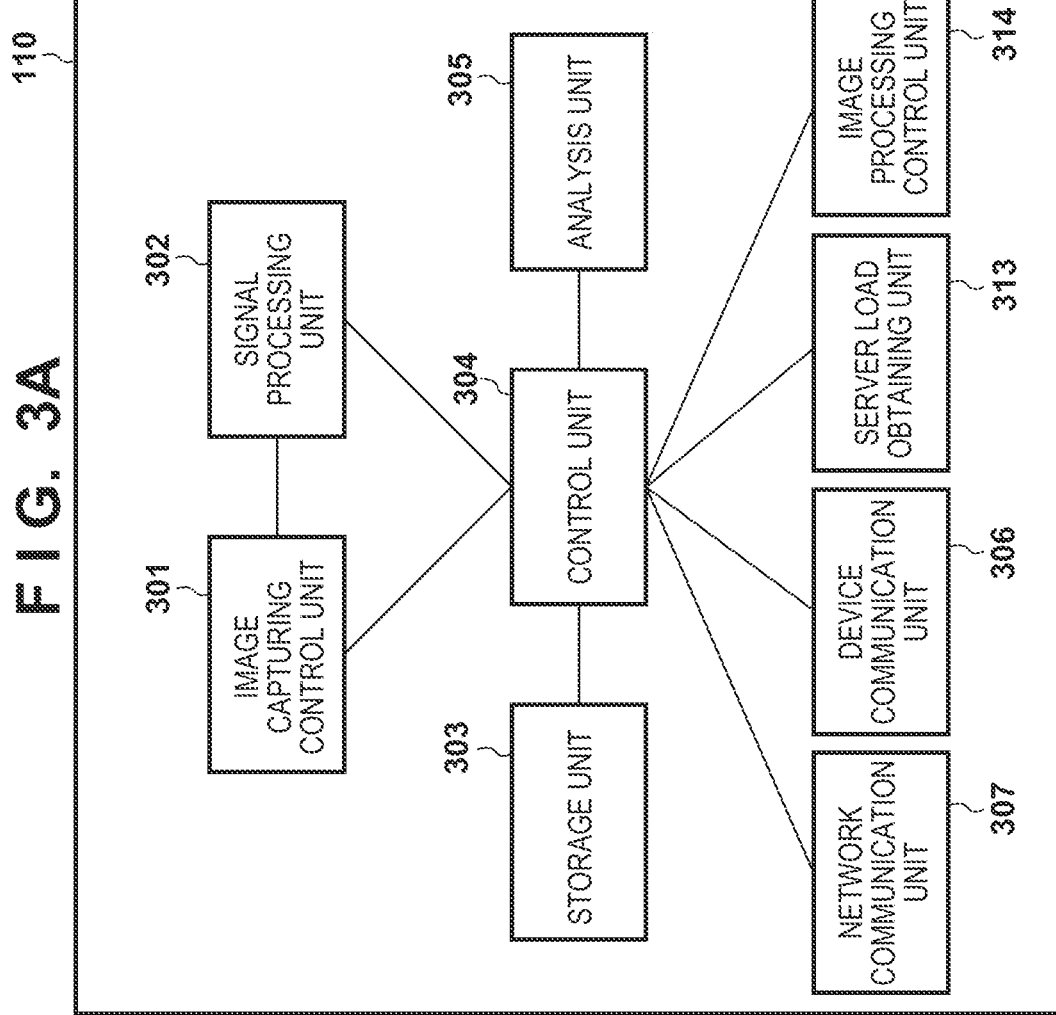

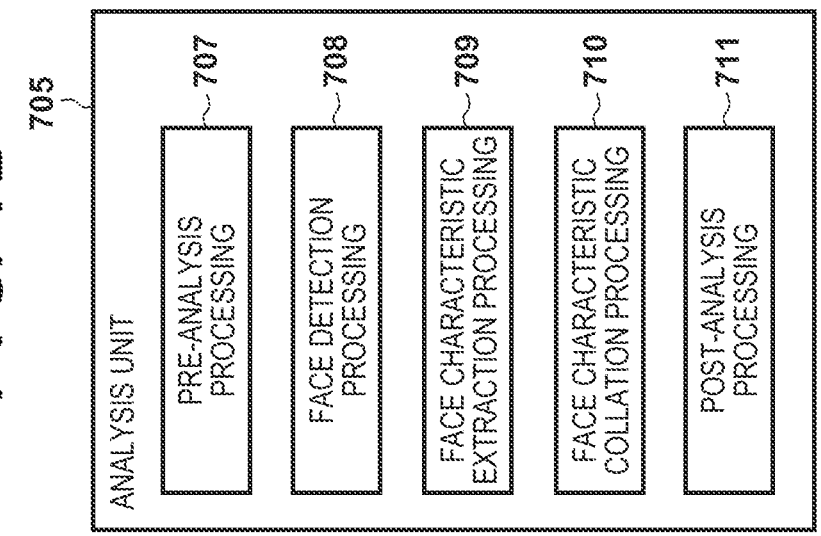
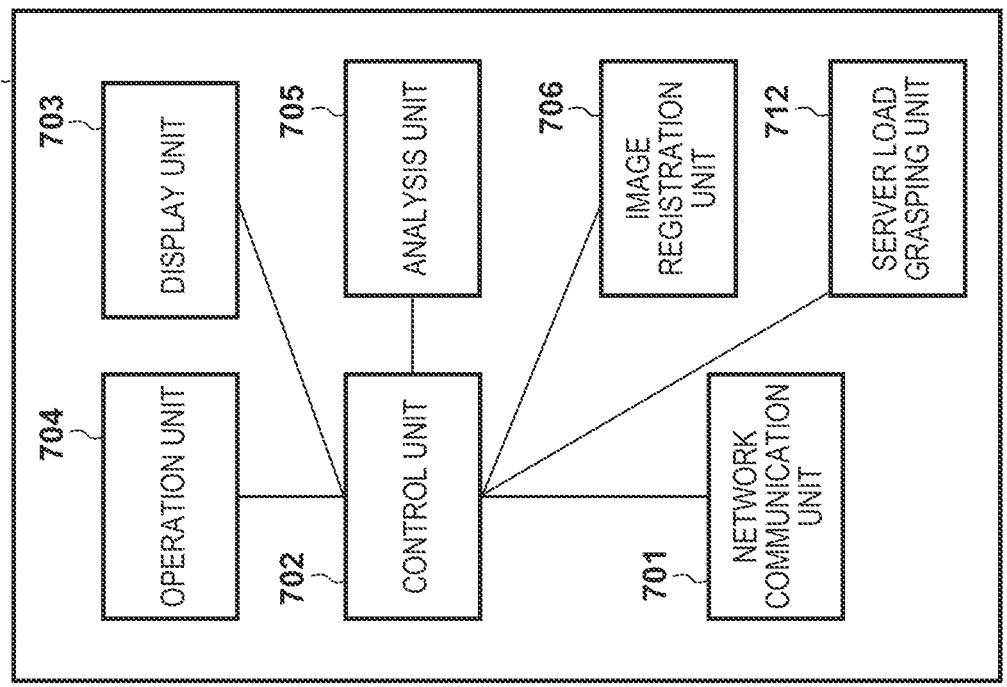

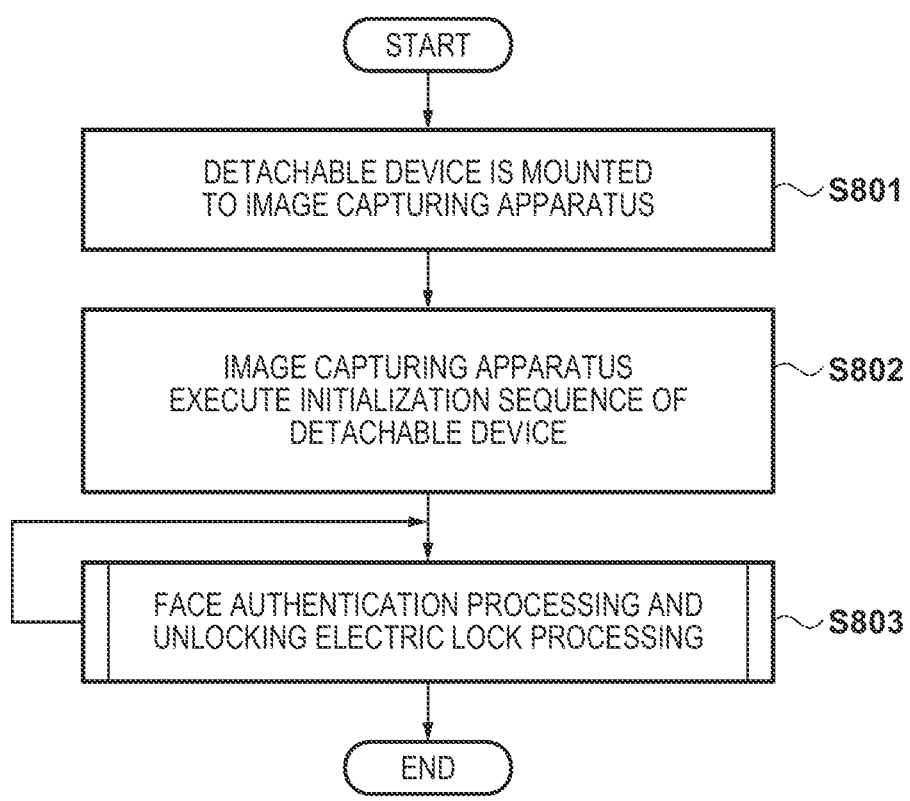

| SERVER | PRE-PROCESSING | FACE DETECTION | POST-PROCESSING | FACE CHARACTERISTIC EXTRACTION | FACE CHARACTERISTIC COLLATION |
|---|---|---|---|---|---|
| IMAGE PROCESSING CAPABILITY | ○ | ○ | ○ | ○ | ○ |

1002

| IMAGE CAPTURING APPARATUS | PRE-PROCESSING | FACE DETECTION | POST-PROCESSING | FACE CHARACTERISTIC EXTRACTION | FACE CHARACTERISTIC COLLATION |
|---|---|---|---|---|---|
| IMAGE PROCESSING CAPABILITY | ○ | ○ | ○ | ○ | ○ |

1003

| DETACHABLE DEVICE | PRE-PROCESSING | FACE DETECTION | POST-PROCESSING | FACE CHARACTERISTIC EXTRACTION | FACE CHARACTERISTIC COLLATION |
|---|---|---|---|---|---|
| IMAGE PROCESSING CAPABILITY | × | ○ | × | ○ | ○ |

1004

| SERVER LOAD STATE |
|---|
| LOW (1005) |
| MEDIUM (1006) |
| HIGH (1007) |

1008

| IMAGE CAPTURING APPARATUS HARDWARE CAPABILITY |
|---|
| LOW SPEED (1009) |
| HIGH SPEED (1010) |

1011

| DETACHABLE DEVICE HARDWARE CAPABILITY |
|---|
| NOT INSERTED (1012) |
| LOW SPEED (1013) |
| HIGH SPEED (1014) |

FIG. 10B

| SERVER LOAD STATE | IMAGE CAPTURING APPARATUS CPU PERFORMANCE | DETACHABLE DEVICE TYPE | PRE-PROCESSING | FACE DETECTION | POST-PROCESSING | FACE CHARACTERISTIC EXTRACTION | FACE CHARACTERISTIC COLLATION |
|---|---|---|---|---|---|---|---|
| LOW | LOW SPEED | NOT INSERTED | SERVER | SERVER | SERVER | SERVER | SERVER |
| LOW | LOW SPEED | LOW PERFORMANCE | SERVER | SERVER | SERVER | SERVER | SERVER |
| LOW | LOW SPEED | HIGH PERFORMANCE | SERVER | SERVER | SERVER | SERVER | SERVER |
| LOW | HIGH SPEED | NOT INSERTED | SERVER | SERVER | SERVER | SERVER | SERVER |
| LOW | HIGH SPEED | LOW PERFORMANCE | IMAGE CAPTURING APPARATUS | DETACHABLE DEVICE | CAMERA | SERVER | SERVER |
| LOW | HIGH SPEED | HIGH PERFORMANCE | IMAGE CAPTURING APPARATUS | DETACHABLE DEVICE | CAMERA | SERVER | SERVER |
| MEDIUM | LOW SPEED | NOT INSERTED | SERVER | SERVER | SERVER | SERVER | SERVER |
| MEDIUM | LOW SPEED | LOW PERFORMANCE | IMAGE CAPTURING APPARATUS | DETACHABLE DEVICE | IMAGE CAPTURING APPARATUS | DETACHABLE DEVICE | DETACHABLE DEVICE |
| MEDIUM | LOW SPEED | HIGH PERFORMANCE | IMAGE CAPTURING APPARATUS | DETACHABLE DEVICE | IMAGE CAPTURING APPARATUS | DETACHABLE DEVICE | DETACHABLE DEVICE |
| MEDIUM | HIGH SPEED | NOT INSERTED | SERVER | SERVER | SERVER | SERVER | SERVER |
| MEDIUM | HIGH SPEED | LOW PERFORMANCE | IMAGE CAPTURING APPARATUS | DETACHABLE DEVICE | IMAGE CAPTURING APPARATUS | DETACHABLE DEVICE | DETACHABLE DEVICE |
| MEDIUM | HIGH SPEED | HIGH PERFORMANCE | IMAGE CAPTURING APPARATUS | DETACHABLE DEVICE | IMAGE CAPTURING APPARATUS | DETACHABLE DEVICE | DETACHABLE DEVICE |
| HIGH | LOW SPEED | NOT INSERTED | SERVER | SERVER | SERVER | SERVER | SERVER |
| HIGH | LOW SPEED | LOW PERFORMANCE | IMAGE CAPTURING APPARATUS | DETACHABLE DEVICE | IMAGE CAPTURING APPARATUS | DETACHABLE DEVICE | DETACHABLE DEVICE |
| HIGH | LOW SPEED | HIGH PERFORMANCE | IMAGE CAPTURING APPARATUS | DETACHABLE DEVICE | IMAGE CAPTURING APPARATUS | DETACHABLE DEVICE | DETACHABLE DEVICE |
| HIGH | HIGH SPEED | NOT INSERTED | SERVER | SERVER | SERVER | SERVER | SERVER |
| HIGH | HIGH SPEED | LOW PERFORMANCE | IMAGE CAPTURING APPARATUS | DETACHABLE DEVICE | IMAGE CAPTURING APPARATUS | DETACHABLE DEVICE | DETACHABLE DEVICE |
| HIGH | HIGH SPEED | HIGH PERFORMANCE | IMAGE CAPTURING APPARATUS | DETACHABLE DEVICE | IMAGE CAPTURING APPARATUS | DETACHABLE DEVICE | DETACHABLE DEVICE |

1015

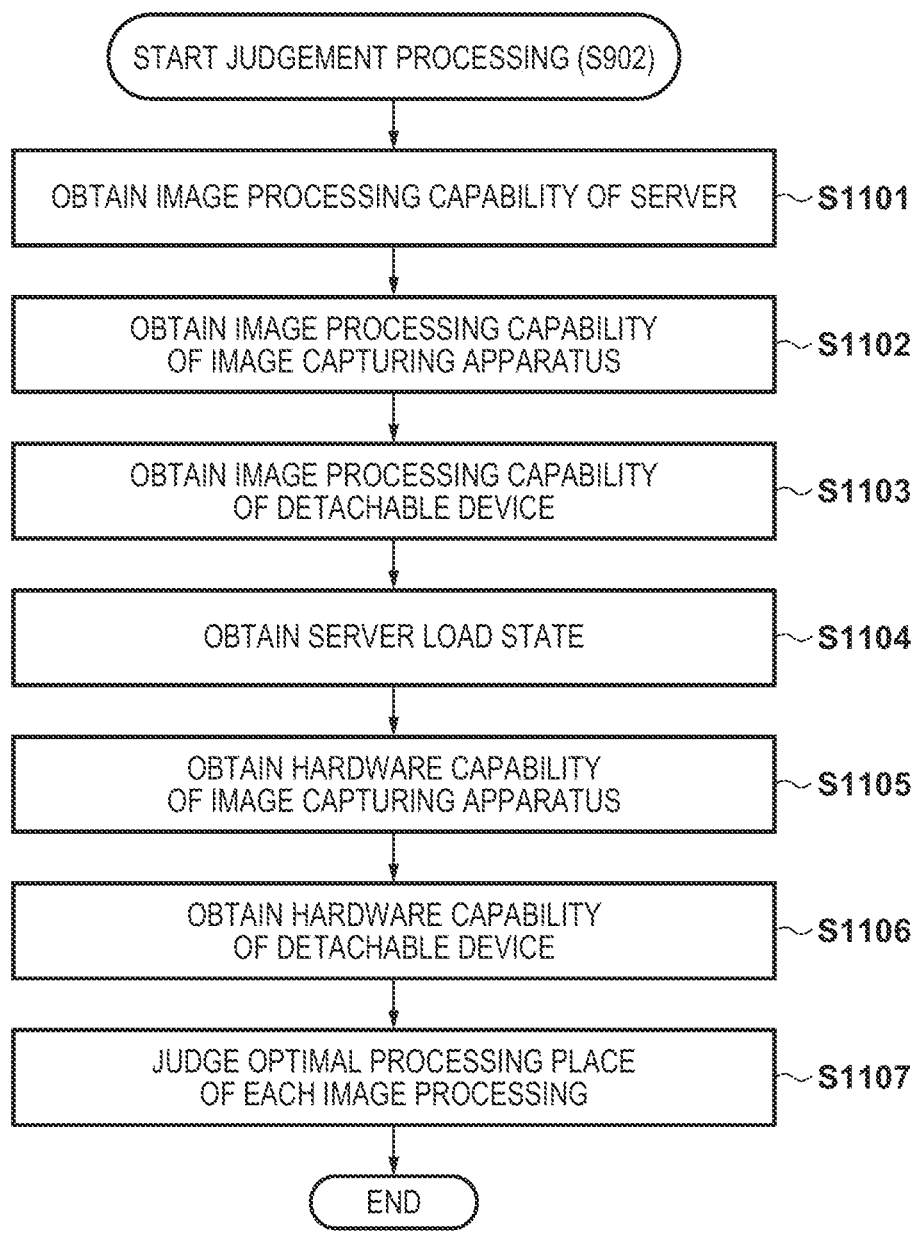

FIG. 12

| 1201 | LOAD STATE OF SERVER | PRE-PROCESSING | FACE DETECTION | POST-PROCESSING | FACE CHARACTERISTIC EXTRACTION | FACE CHARACTERISTIC COLLATION |
|---|---|---|---|---|---|---|
| 1202 | LOW LOAD | 10ms | 50ms | 5ms | 30ms | 20ms |
| 1203 | MEDIUM LOAD | 20ms | 100ms | 10ms | 60ms | 40ms |
| 1204 | HIGH LOAD | 30ms | 150ms | 15ms | 90ms | 60ms |
| 1205 | NUMBER OF WAITING | 3 | 2 | 2 | 0 | 0 |

| 1206 | PROCESSING TIME OF CAPTURING APPARATUS | PRE-PROCESSING | FACE DETECTION | POST-PROCESSING | FACE CHARACTERISTIC EXTRACTION | FACE CHARACTERISTIC COLLATION |
|---|---|---|---|---|---|---|
| 1207 | LOW SPEED | 200ms | 5000ms | 100ms | 3000ms | 2000ms |
| 1208 | HIGH SPEED | 20ms | 1000ms | 10ms | 600ms | 400ms |

| 1209 | PROCESSING TIME OF DETACHABLE DEVICE | PRE-PROCESSING | FACE DETECTION | POST-PROCESSING | FACE CHARACTERISTIC EXTRACTION | FACE CHARACTERISTIC COLLATION |
|---|---|---|---|---|---|---|
| 1210 | NOT INSERTED | × | × | × | × | × |
| 1211 | LOW SPEED | × | 200ms | × | 120ms | 80ms |
| 1212 | HIGH SPEED | × | 100ms | × | 60ms | 40ms |

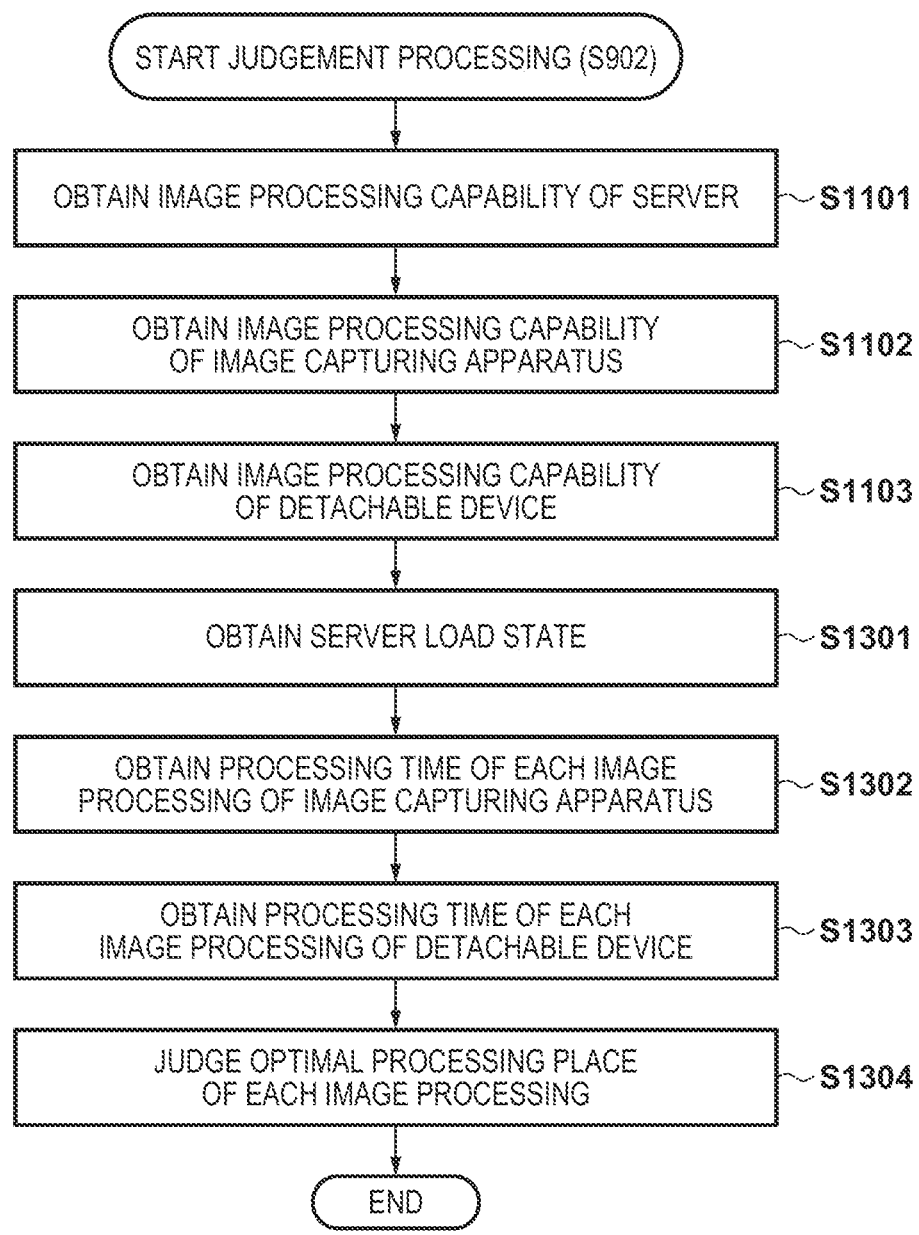

FIG. 14

1401
| SERVER | PRE-PROCESSING | FACE DETECTION | POST-PROCESSING | FACE CHARACTERISTIC EXTRACTION | FACE CHARACTERISTIC COLLATION |
|---|---|---|---|---|---|
| IMAGE PROCESSING CAPABILITY | ○ | ○ | ○ | ○ | ○ |
| IMAGE PROCESSING ACCURACY | — | HIGH ACCURACY | — | — | — |

1402
| IMAGE CAPTURING APPARATUS | PRE-PROCESSING | FACE DETECTION | POST-PROCESSING | FACE CHARACTERISTIC EXTRACTION | FACE CHARACTERISTIC COLLATION |
|---|---|---|---|---|---|
| IMAGE PROCESSING CAPABILITY | ○ | ○ | ○ | ○ | ○ |
| IMAGE PROCESSING ACCURACY | — | LOW ACCURACY | — | — | — |

1403
| DETACHABLE DEVICE | PRE-PROCESSING | FACE DETECTION | POST-PROCESSING | FACE CHARACTERISTIC EXTRACTION | FACE CHARACTERISTIC COLLATION |
|---|---|---|---|---|---|
| IMAGE PROCESSING CAPABILITY | × | ○ | × | ○ | ○ |
| IMAGE PROCESSING ACCURACY | — | MEDIUM ACCURACY | — | — | — |

IMAGE CAPTURING APPARATUS, PROCESSING SYSTEM, AND CONTROL METHOD THAT DETERMINE, BASED ON A LOAD STATE, WHICH OF A DETACHABLE DEVICE AND AN EXTERNAL PROCESSING APPRARATUS IS TO BE USED TO PERFORM ANALYSIS PROCESSING

CROSS-REFERENCE TO PRIORITY APPLICATION

This application claims the benefit of Japanese Patent Application No. 2021-191435, filed Nov. 25, 2021, which is hereby incorporated by reference herein in its entirety.

BACKGROUND OF THE INVENTION

Field of the Invention

The present invention relates to a technique of distributing processing.

Description of the Related Art

In recent years, solutions for performing face authentication using an image captured by a monitoring camera and managing access have proliferated. Since the processing load of image processing, such as face authentication, is relatively high, a configuration is conventionally used, in which the monitoring camera transfers an obtained video to a high-performance arithmetic apparatus (a PC or a server) in a remote site, and the arithmetic apparatus performs image processing. However, along with the improvement of the processing capability of a recent mobile arithmetic apparatus, image processing can be performed on the monitoring camera side (locally). The processing on the monitoring camera side can be executed by, for example, an arithmetic apparatus arranged in the camera body. The processing can also be executed by an arithmetic apparatus in a detachable device connected to the camera body. If image processing is performed on the monitoring camera side, a load of image processing in the server or a communication load in a communication network can be reduced.

Japanese Patent Laid-Open No. 7-184098 describes a technique of providing an extension function by connecting a detachable device to an image capturing apparatus. Japanese Patent Laid-Open No. 2019-219804 describes a technique of mounting a detachable device on an image capturing apparatus and switching processing between the detachable device and the image capturing apparatus based on an execution instruction.

In the above-described patent documents, however, although extension of processing in the detachable device is described, an efficient use method including processing distribution with server processing is not examined. In general, as the characteristic of the image capturing apparatus and the detachable device, hardware performance is lower than a personal computer (PC) or a server. For this reason, the techniques described in the above-described patent literatures cannot optimize processing in the entire system.

SUMMARY OF THE INVENTION

According to one aspect of the present invention, an image capturing apparatus in which a detachable device including a processing unit configured to execute analysis processing for image data obtained by image capturing is mounted, comprises a communication unit configured to communicate with an external processing apparatus capable of executing the analysis processing for the image data; a processor, and a memory containing instructions that, when executed by the processor, cause the processor to function as a load obtaining unit configured to obtain load information concerning a load state in the external processing apparatus via the communication unit, and a determination unit configured to determine, based on the load information, which one of the processing unit and the external processing apparatus is to be used to perform the analysis processing.

The present invention enables optimization of the processing speed of an entire system.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a block diagram showing an example of the functional configuration of the image capturing apparatus;

FIG. 3B is a block diagram showing an example of the functional configuration of an analysis unit;

FIG. 7A is a block diagram showing an example of the functional configuration of the server;

FIG. 7B is a block diagram showing an example of the functional configuration of an analysis unit;

FIG. 8 is a flowchart showing an example of the procedure of processing executed by the system;

FIG. 10A is a view showing an example of tables used for image processing execution place judgement processing;

FIG. 10B is a view showing an example of a table used for image processing execution place judgement processing;

FIG. 11 is a flowchart showing an example of the procedure of image processing execution place judgement processing;

FIG. 12 is a view showing an example of the load/processing time of each device;

FIG. 13 is a flowchart showing another example of the procedure of image processing execution place judgement processing;

FIG. 14 is a view showing another example of tables for defining the capability of each device;

DESCRIPTION OF THE EMBODIMENTS

Figure 1:
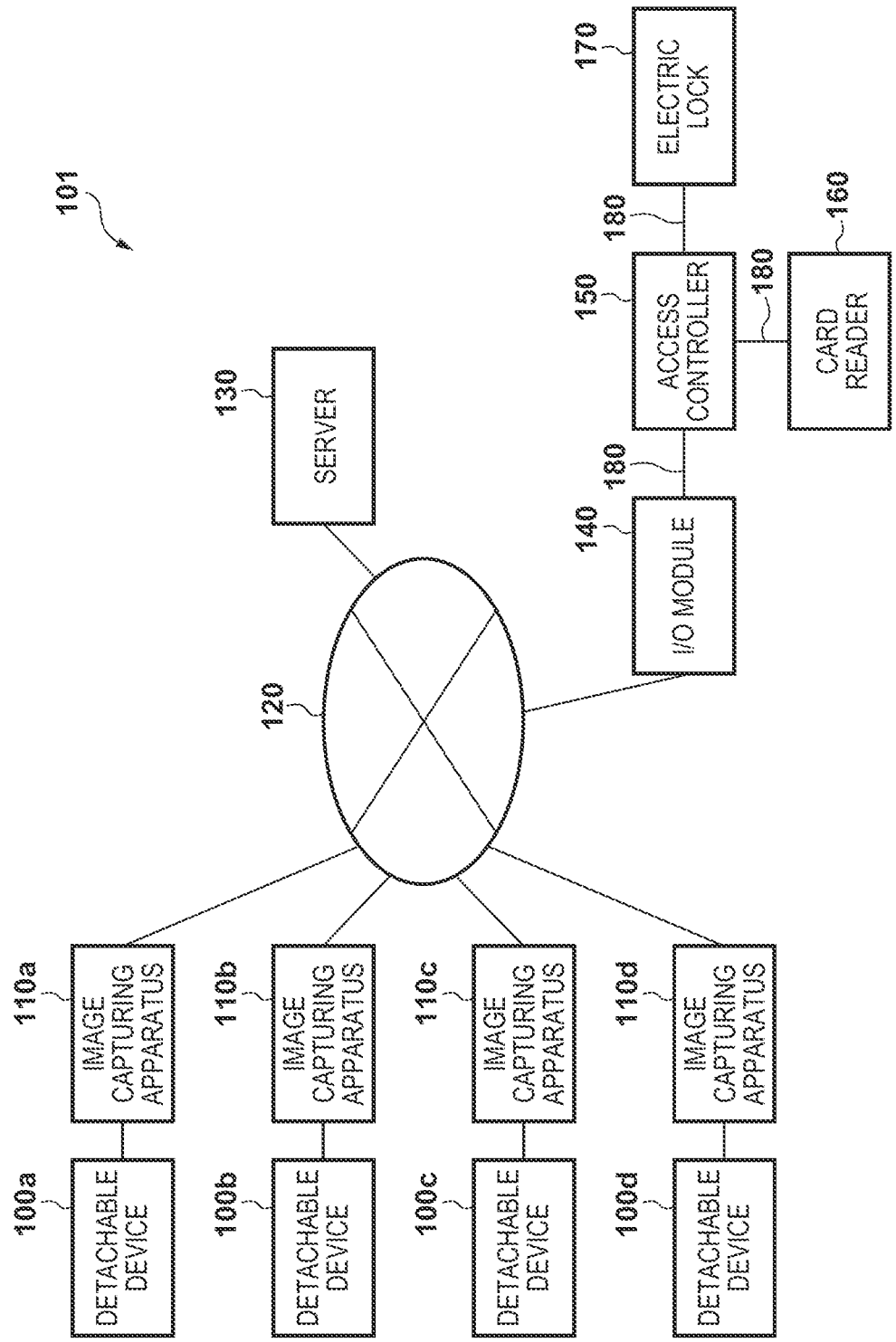
FIG. 1 is a block diagram showing an example of a system configuration.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

As the first embodiment of an information processing apparatus according to the present invention, an image analysis system 101 including an image capturing apparatus 110, a detachable device 100, and a server 130 will now be described below as an example.
<System Configuration>
FIG. 1 shows an example of the configuration of the image analysis system 101 according to this embodiment. As an example, a case in which this system is an access management system will be described below. However, the present invention is not limited to this, and the following argument can be applied to an arbitrary processing system for analyzing an image and performing predetermined information output. This system is configured to include image capturing apparatuses 110a to 110d, a network 120, the server 130 that is an external processing apparatus, and an input/output (I/O) module 140. Note that the image capturing apparatuses 110a to 110d each includes a slot to/from which a device capable of recording, for example, a captured image can be attached/detached, and when the detachable devices 100a to 100d are inserted into the slots, the image capturing apparatuses 110a to 110d are connected to the detachable devices 100a to 100d. Also, an access controller 150, a card reader 160, and an electric lock 170 are connected to the I/O module 140. An identification (ID) card, or the like, is put over the card reader 160, thereby performing ID authentication by the card reader. Note that the detachable devices 100a to 100d will be referred to as "detachable devices 100", and the image capturing apparatuses 110a to 110d will be referred to as "image capturing apparatuses 110" hereafter.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, a secure digital (SD) card, and can, therefore, be configured to be connectable to the image capturing apparatus 110 without making any portion project from the image capturing apparatus 110. This can prevent the detachable device 100 from interfering with an obstacle such as a wiring and raise the convenience when using the device. In addition, since an SD card slot is prepared in a lot of existing image capturing apparatuses 110, such as a network camera, the detachable device 100 can provide an extension function to the existing image capturing apparatus 110. Note that, other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing, but may be implemented in another form.

The image capturing apparatus 110 is an image capturing apparatus such as a network camera. In this embodiment, the image capturing apparatus 110 incorporates an arithmetic apparatus (information processing apparatus) capable of processing a video, but is not limited to this. For example, an external computer such as an information processing apparatus (PC: Personal Computer) connected to the image capturing apparatus 110 may exist, and the combination may be handled as the image capturing apparatus 110. Additionally, in this embodiment, the detachable devices 100 are mounted in all the image capturing apparatuses 110. Note that FIG. 1 shows four image capturing apparatuses 110, and the detachable devices mounted in these. The number of combinations of devices may be three or less, or five or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus in the image capturing apparatus 110.

The server 130 is formed by a computer such as a PC and has an image analysis processing function. In addition, the server 130 is an apparatus that performs acceptance of input from a user and output of information (for example, display of information) to the user.

The image capturing apparatuses 110 and the server 130 are communicably connected via the network 120. The network 120 is configured to include a plurality of routers, switches, cables, and the like, which satisfy the communication standard of, for example, Ethernet®. In this embodiment, the network 120 can be an arbitrary network that enables communication between the image capturing apparatus 110 and the server 130, and can be constructed by an arbitrary scale and configuration, and a communication standard with which to comply. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

The I/O module 140 is communicably connected to the image capturing apparatus 110 and the server 130 via the network 120. The I/O module 140 receives a hypertext transfer protocol (HTTP) event (for example, an unlocking event) from the image capturing apparatus 110 or the server 130, and transmits an electrical control signal to the access controller 150 via an electrical wire 180.

The access controller 150 is connected to the I/O module 140, the card reader 160, and the electric lock 170 via the electric wires 180. The access controller 150 has a card collation/discrimination function, performs card collation/discrimination using card information read by the card reader 160, and controls locking and unlocking of the electric lock 170. Also, the access controller 150 receives an electrical control signal from the I/O module 140, and controls locking and unlocking of the electric lock 170. The card reader 160 is a reader for a magnetic card or a noncontact integrated circuit (IC) card, and transmits read information to the access controller 150. The electric lock 170 is a lock whose locking/unlocking is controlled by electric control.

<Apparatus Configuration>
(Configuration of Image Capturing Apparatus)

Figure 2:
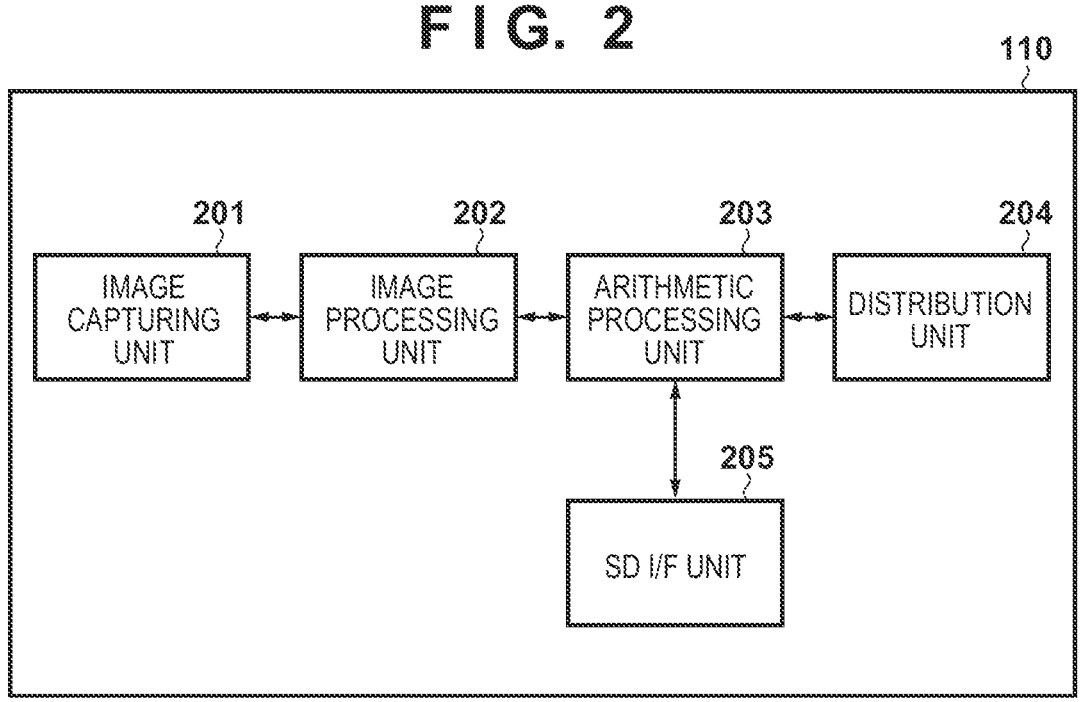
FIG. 2 is a block diagram showing an example of the hardware configuration of an image capturing apparatus.

The configuration of the image capturing apparatus 110 will be described next. FIG. 2 is a block diagram showing an example of the hardware configuration of the image capturing apparatus 110. As the hardware configuration, the image capturing apparatus 110 includes, for example, an image capturing unit 201, an image processing unit 202, an arithmetic processing unit 203, a distribution unit 204, and a secure digital interface (SD I/F) unit 205.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has a gain function of adjusting sensitivity when converting light into an analog signal. These functions are adjusted based on set values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit set values to the lens portion and the image capturing element, and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of a Central Processing Unit, MPU is the acronym of a Micro Processing Unit, RAM is the acronym of a Random Access Memory, and ROM is the acronym of Read Only Memory. In an example, the arithmetic processing unit 203 can determine allocation concerning which one of the image capturing apparatus 110, the detachable device 100, and the server 130 should execute each portion of processing to be executed in the above-described system, and execute processing corresponding to the allocation. Details of processing contents and processing allocation will be described later. The image received from the image processing unit 202 or the processing result of the arithmetic processing unit 203 is transferred to the distribution unit 204 or the SD I/F unit 205.

The distribution unit 204 is configured to include a network distribution engine and, for example, peripheral devices such as a RAM and an ethernet physical layer (ETH PHY) module. The ETH PHY module is a module that executes processing of the physical (PHY) layer of Ethernet. The distribution unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the secure digital (SD) standard formulated by the SD Association. Communication between the detachable device 100 and the image capturing apparatus 110, such as transfer of an image obtained from the arithmetic processing unit 203 to the detachable device 100, or data obtaining from the detachable device 100, is performed via the SD I/F unit 205.

FIG. 3A shows an example of the functional configuration of the image capturing apparatus 110. Also, FIG. 3B shows the detailed configuration of an analysis unit 305. The image capturing apparatus 110 includes, as its functions, for example, an image capturing control unit 301, a signal processing unit 302, a storage unit 303, a control unit 304, the analysis unit 305, a device communication unit 306, and a network communication unit 307.

The image capturing control unit 301 executes control of capturing the peripheral environment via the image capturing unit 201. The signal processing unit 302 performs predetermined processing for the image captured by the image capturing control unit 301, thereby generating data of the captured image. The data of the captured image will simply be referred to as the "captured image" hereafter. The signal processing unit 302, for example, encodes the image captured by the image capturing control unit 301. The signal processing unit 302 performs encoding for a still image using, for example, an encoding method such as JPEG (Joint Photographic Experts Group). The signal processing unit 302 performs encoding for a moving image using an encoding method such as H.264/MPEG-4 AVC (to be referred to as "H.264" hereafter) or HEVC (High Efficiency Video Coding). The signal processing unit 302 may encode an image using an encoding method selected by the user from a plurality of encoding methods set in advance via, for example, an operation unit (not shown) of the image capturing apparatus 110.

The storage unit 303 stores a list of analysis processing executable by the analysis unit 305. The storage unit 303 also stores a result of analysis processing to be described later. The control unit 304 controls the signal processing unit 302, the storage unit 303, the analysis unit 305, the device communication unit 306, and the network communication unit 307 to execute predetermined processing.

The analysis unit 305 selectively executes at least one of pre-analysis processing 308, face detection processing 309, face characteristic extraction processing 310, face characteristic collation processing 311, and post-analysis processing 312 to be described later for a captured image.

The pre-analysis processing 308 is processing to be executed for a captured image before face detection processing, to be described later, is executed. In the pre-analysis processing 308 according to this embodiment, as an example, a captured image is divided to create divided images.

The face detection processing 309 is processing of performing face detection for the divided image obtained by the pre-analysis processing 308 and outputting face position region information representing the region of a detected face, and a face likelihood that is the likelihood of a face (face likelihood). The face detection processing 309 can be processing configured to output the position of a face in the divided image using, for example, a machine learning model.

The face characteristic extraction processing 310 is processing of using the face position region information output from the face detection processing 309, cropping the face image region from the divided image, and extracting a face characteristic. The extracted face characteristic is output as a multidimensional vector.

The face characteristic collation processing 311 is processing of performing collation between a face characteristic list for a plurality of face images registered in an image registration unit to be described later, which the image capturing apparatus 110 obtains from the server 130 in advance, and a face characteristic extracted by the face characteristic extraction processing 310. In the face characteristic collation processing 311 according to this embodiment, as an example, the distance between a face characteristic (multidimensional vector) of a registered image and an extracted face characteristic (multidimensional vector) is calculated, and if the distance is equal to or less than a predetermined threshold, collation is OK. If the distance is less than the predetermined threshold, collation is NG.

The post-analysis processing 312 is processing of filtering likelihoods (face likelihoods) detected by the face detection processing 309 using a predetermined threshold and integrating overlapping face position regions based on the face likelihood value. A list of combinations of face position region information and face likelihoods after the post-analysis processing 312 is performed will be referred to as metadata hereafter.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 100, and converts the received data into a format processible by the image capturing apparatus 110. In this embodiment, as the conversion processing, the device communication unit 306 executes processing of converting a decimal between a floating point format and a fixed point format. However, the present invention is not limited to this, and another processing may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the server 130 via the network 120.

A server load obtaining unit 313 obtains load information representing the load state of the server from the server 130 via the network communication unit 307 (load obtaining). Based on the server load state and the image processing capability of each device to be described later, an image processing control unit 314 judges whether each image processing should be performed by the image capturing apparatus 110, the detachable device 100, or the server 130.

(Configuration of Detachable Device)

Figure 4:
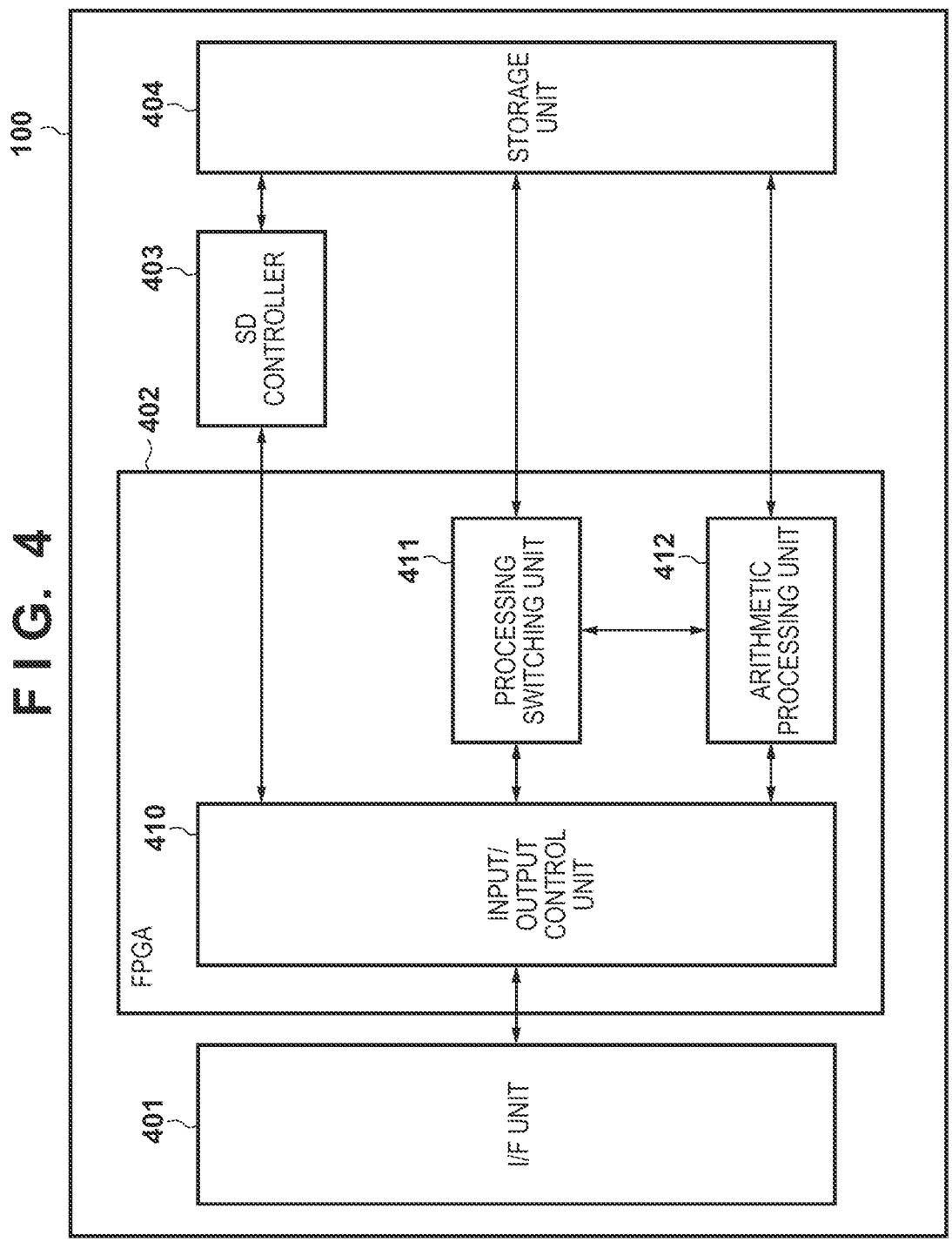
FIG. 4 is a block diagram showing an example of the hardware configuration of a detachable device.

FIG. 4 is a block diagram showing an example of the hardware configuration of the detachable device 100. As an example, the detachable device 100 is configured to include an I/F unit 401, an FPGA 402, an SD controller 403, and a storage unit 404. The detachable device 100 is formed into a shape that can be inserted/removed into/from the attaching/detaching socket of the SD I/F unit 205 provided in the image capturing apparatus 110, that is, a shape complying with the SD standard.

The I/F unit 401 is an interface portion used to connect an apparatus such as the image capturing apparatus 110 and the detachable device 100. The I/F unit 401 is configured to include, for example, an electrical contact terminal that receives supply of power from the image capturing apparatus 110 and generates and distributes a power supply to be used in the detachable device 100, and the like. Concerning items defined in the SD standard, the I/F unit 401 complies with that, like the SD I/F unit 205 of the image capturing apparatus 110. Reception of images and setting data from the image capturing apparatus 110 and transmission of data from the FPGA 402 to the image capturing apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconstructing an internal logic circuit structure. By processing implemented by the FPGA 402, a processing function can be added to the apparatus in which the detachable device 100 is mounted. Additionally, since the logic circuit structure can be changed later by the reconstruction function of the FPGA 402, when the detachable device 100 is mounted in, for example, an apparatus in a field of a quickly advancing technology, appropriate processing can be executed in the apparatus at an appropriate timing. Note that, in this embodiment, an example in which an FPGA is used will be described. However, for example, a general-purpose ASIC or a dedicated LSI may be used if processing to be described later can be executed. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, the image capturing apparatus 110 may write the setting data in the FPGA 402 via the I/F unit 401 by implementing a dedicated circuit in the detachable device.

The input/output control unit 410 is configured to include a circuit used to transmit/receive an image to/from the image capturing apparatus 110, a circuit that analyzes a command received from the image capturing apparatus 110, a circuit that controls based on a result of analysis, and the like. Commands here are defined by the SD standard, and the input/output control unit 410 can detect some of them. Details of the functions will be described later. The input/output control unit 410 controls operation to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the image capturing apparatus 110 and to write the information in the arithmetic processing unit 412. The information of the image analysis processing function includes setting parameters representing, for example, the order and types of operations processed in the arithmetic processing unit 412, the coefficients of operations, and the like. The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the image capturing apparatus 110, and/or records the processing result in the storage unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capturing apparatus 110. Note that holding a plurality of setting data corresponding to a plurality of processing functions will be referred to as holding a plurality of processing functions hereafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the image capturing apparatus 110, the information of the image analysis processing function written in the arithmetic processing unit 412, and setting data of the FPGA 402.

Figure 5B:
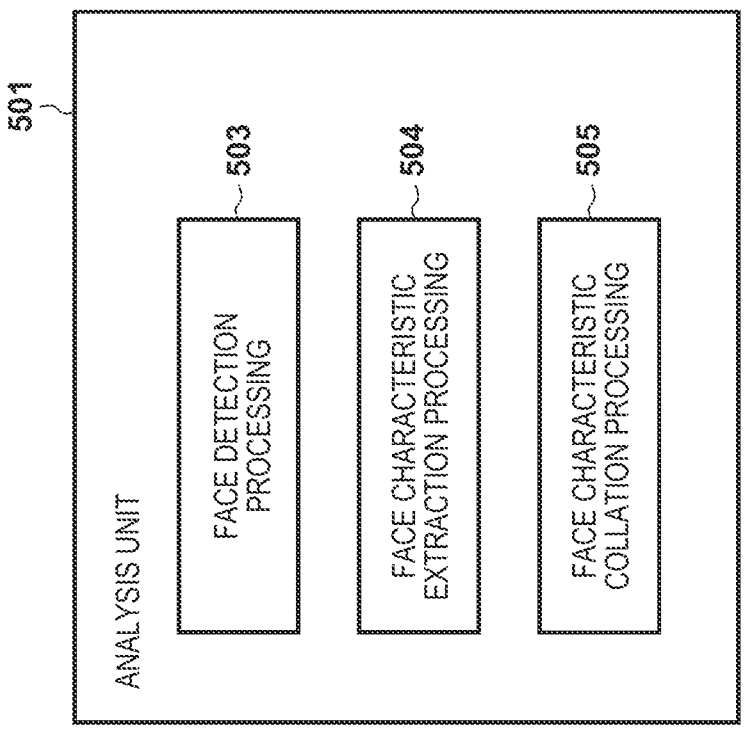
FIG. 5B is a block diagram showing an example of the functional configuration of an analysis unit.
Figure 5A:
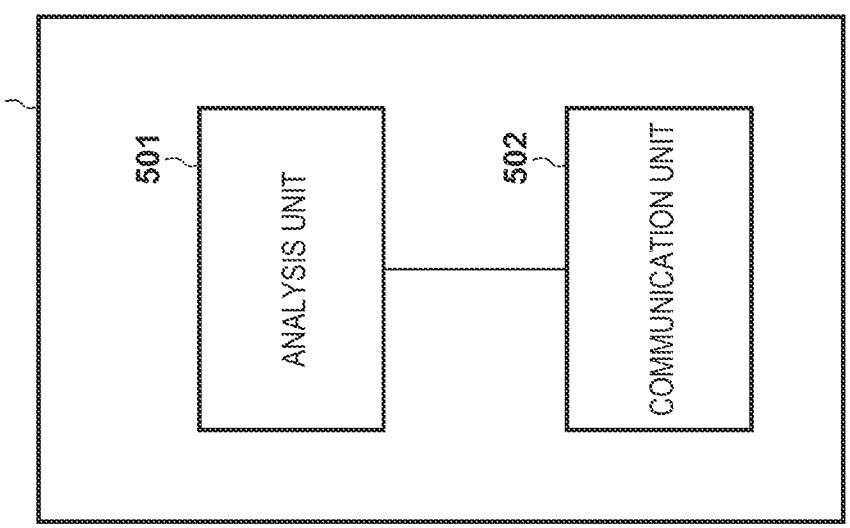
FIG. 5A is a block diagram showing an example of the functional configuration of the detachable device.

FIG. 5A shows an example of the functional configuration of the detachable device 100. Also, FIG. 5B shows the detailed configuration of an analysis unit 501. The detachable device 100 includes, as its functional configuration, for example, the analysis unit 501 and a communication unit 502. The analysis unit 501 executes analysis processing for an image.

The analysis unit 501 executes analysis processing for an image. In this embodiment, the analysis unit 501 executes face detection processing 503, face characteristic extraction processing 504, and face characteristic collation processing 505. However, the present invention is not limited to this. Note that, since the face detection processing 503 is the same as the above-described face detection processing 309, the face characteristic extraction processing 504 is the same as the above-described face characteristic extraction processing 310, and the face characteristic collation processing 505 is the same as the above-described face characteristic collation processing 311, a description of these will be omitted. However, processing performance can change in accordance with the hardware performance to execute or the algorithm of analysis processing. The communication unit 502 performs communication with the image capturing apparatus 110 via the I/F unit 401.

(Configuration of Server)

Figure 6:
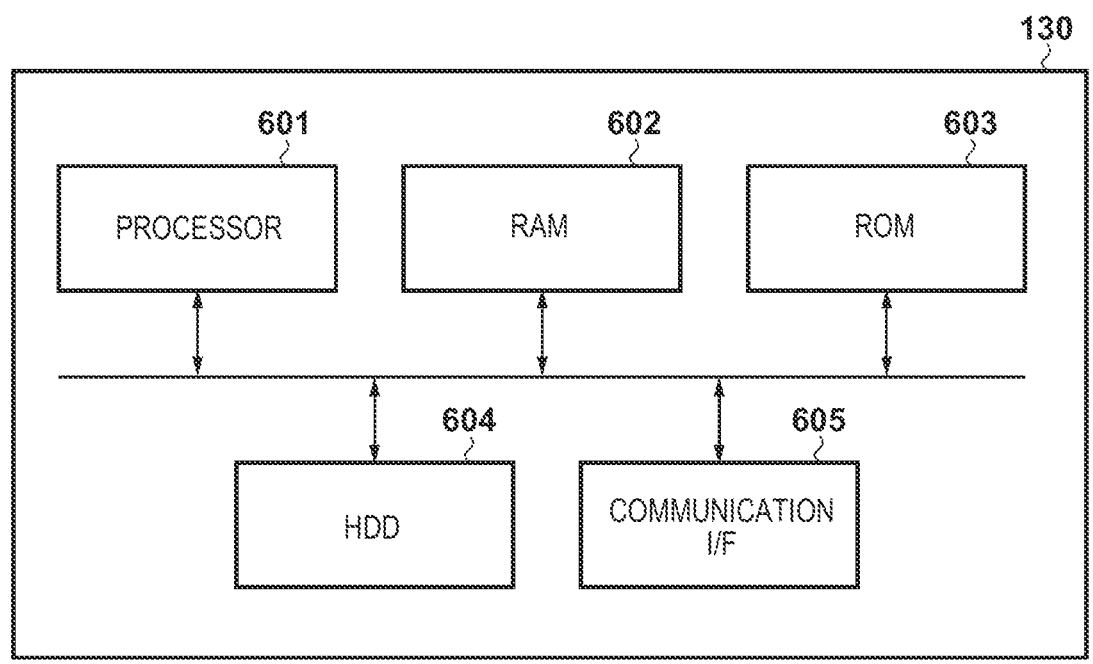
FIG. 6 is a block diagram showing an example of the hardware configuration of a server.

FIG. 6 shows an example of the hardware configuration of the server 130. The server 130 is formed as a computer such as a general PC, and is configured to include, for example, a processor 601 such as a CPU, memories such as a RAM 602 and a ROM 603, a storage device such as an HDD 604, and a communication I/F 605, as shown in FIG. 6. The server 130 can execute various kinds of functions by executing, by the processor 601, programs stored in the memories and the storage device.

FIG. 7A shows an example of the functional configuration of the server 130 according to this embodiment. Also, FIG. 7B shows the detailed configuration of an analysis unit 705. The server 130 includes, as its functional configuration, for example, a network communication unit 701, a control unit 702, a display unit 703, and an operation unit 704. The network communication unit 701 is connected to, for example, the network 120 and executes communication with an external apparatus such as the image capturing apparatus 110 via the network 120. Note that this is merely an example and, for example, the network communication unit 701 may be configured to establish direct communication with the image capturing apparatus 110 and communicate with the image capturing apparatus 110 without intervention of the network 120 or other apparatus. The control unit 702 controls operation such that the network communication unit 701, the display unit 703, and the operation unit 704 execute processing of their own. The display unit 703 presents information to the user via, for example, a display. In this embodiment, a result of rendering by a browser is displayed on a display, thereby presenting information to the user. Note that information may be presented by a method such as an audio signal or a vibration signal, other than a screen display. The operation unit 704 accepts an operation from the user. In this embodiment, the operation unit 704 is a mouse or a keyboard, and the user operates these to input a user operation to the browser. However, the operation unit 704 is not limited to this and may be, for example, another arbitrary device capable of detecting a user's intention, such as a touch panel or a microphone.

The analysis unit 705 executes analysis processing for an image. In this embodiment, executable analysis processing includes pre-analysis processing 707, face detection processing 708, face characteristic extraction processing 709, face characteristic collation processing 710, and post-analysis processing 711. However, the present invention is not limited to this. Note that the processes executable by the analysis unit 705 are the same as the processes executable by the analysis unit 305. However, processing performance can change in accordance with the hardware performance to execute or the algorithm of analysis processing.

An image registration unit 706 manages face images to be collated by the face characteristic collation processing 710 with a face characteristic analyzed from a captured image. A server load grasping unit 712 grasps the load state of the server 130.

<Procedure of Processing>

An example of the procedure of processing executed in the system will be described next. Note that processing executed by the image capturing apparatus 110 in the following processes is implemented by a processor in the arithmetic processing unit 203 executing a program stored in a memory, or the like. In addition, processing executed by the detachable device 100 is implemented by a processor in the arithmetic processing unit 412 executing a program stored in a memory, or the like. Furthermore, processing executed by the server 130 is implemented by the processor 601 executing a program stored in the RAM 602. However, this is merely an example, and processing to be described later may partially or wholly be implemented by dedicated hardware.

(Overall Procedure)

FIG. 8 is a view schematically showing a series of procedures of image analysis processing executed by the image analysis system 101.

In step S801, the image capturing apparatus 110 detects that the detachable device 100 is mounted by the user. In step S802, the image capturing apparatus 110 executes an initialization sequence of the detachable device 100. In this initialization sequence, predetermined commands are transmitted/received between the image capturing apparatus 110 and the detachable device 100. The image capturing apparatus 110 is thus set in a state in which it can use the detachable device 100.

In step S803, the image analysis system 101 performs face authentication processing for a captured image obtained by the image capturing apparatus 110 and unlocks the electric lock 170. Here, the face authentication processing is processing implemented using a plurality of sub-processes (the face detection processing function, the face characteristic extraction processing function, and the face characteristic collation processing function). The face authentication processing is executed by one of the image capturing apparatus 110, the detachable device 100, and the server 130. Details of allocation of the face authentication processing will be described later. Also, the processing in step S803 is repetitively executed for a captured image (each frame image that forms a moving image) obtained by the image capturing apparatus 110.

(Procedure of Face Authentication Processing and Electric Lock Unlocking Processing (Step S803))

Figure 9A:
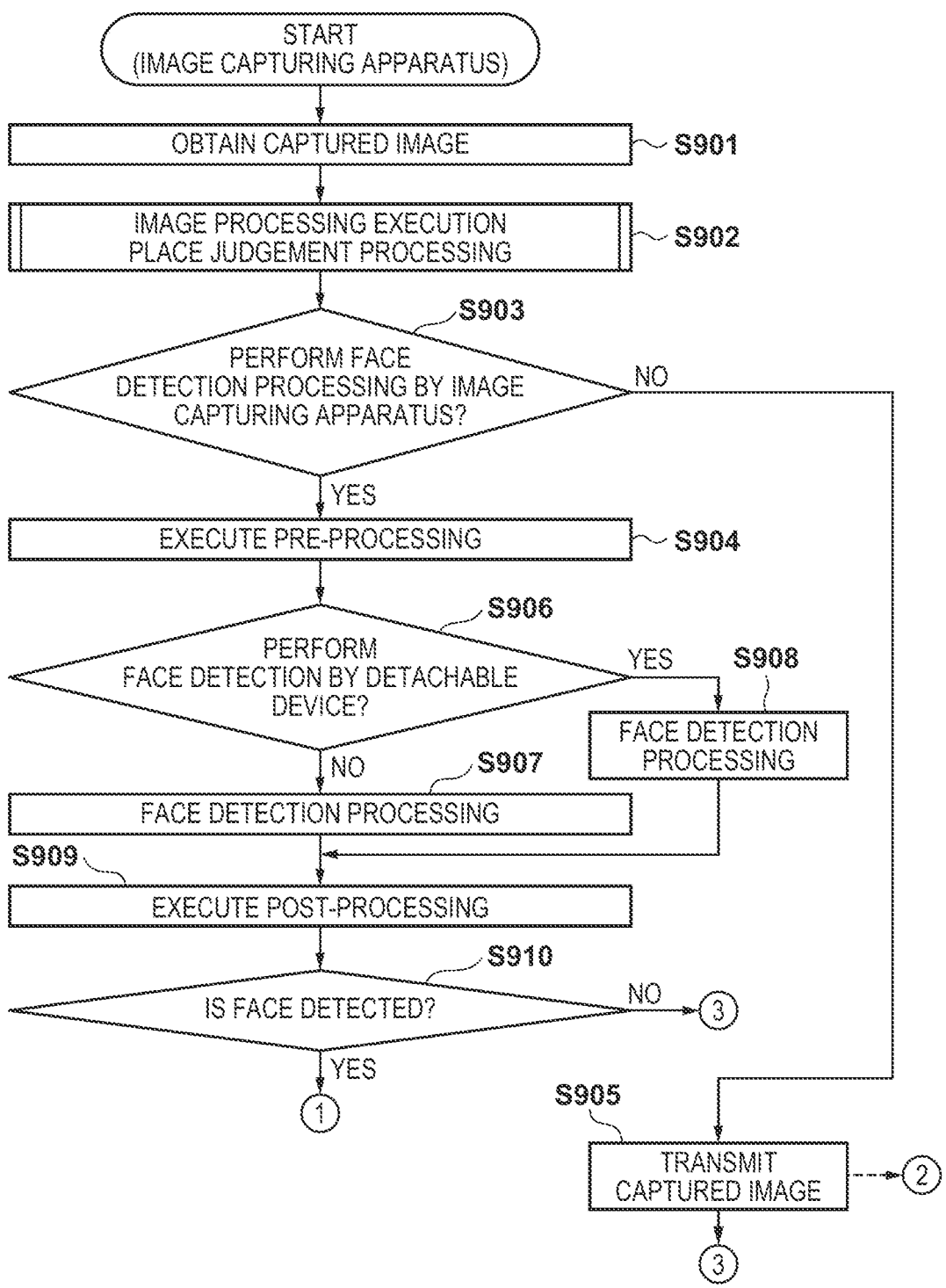
FIGS. 9A to 9C are flowcharts showing an example of the procedure of face authentication processing and electric lock unlocking processing.
Figure 9B:
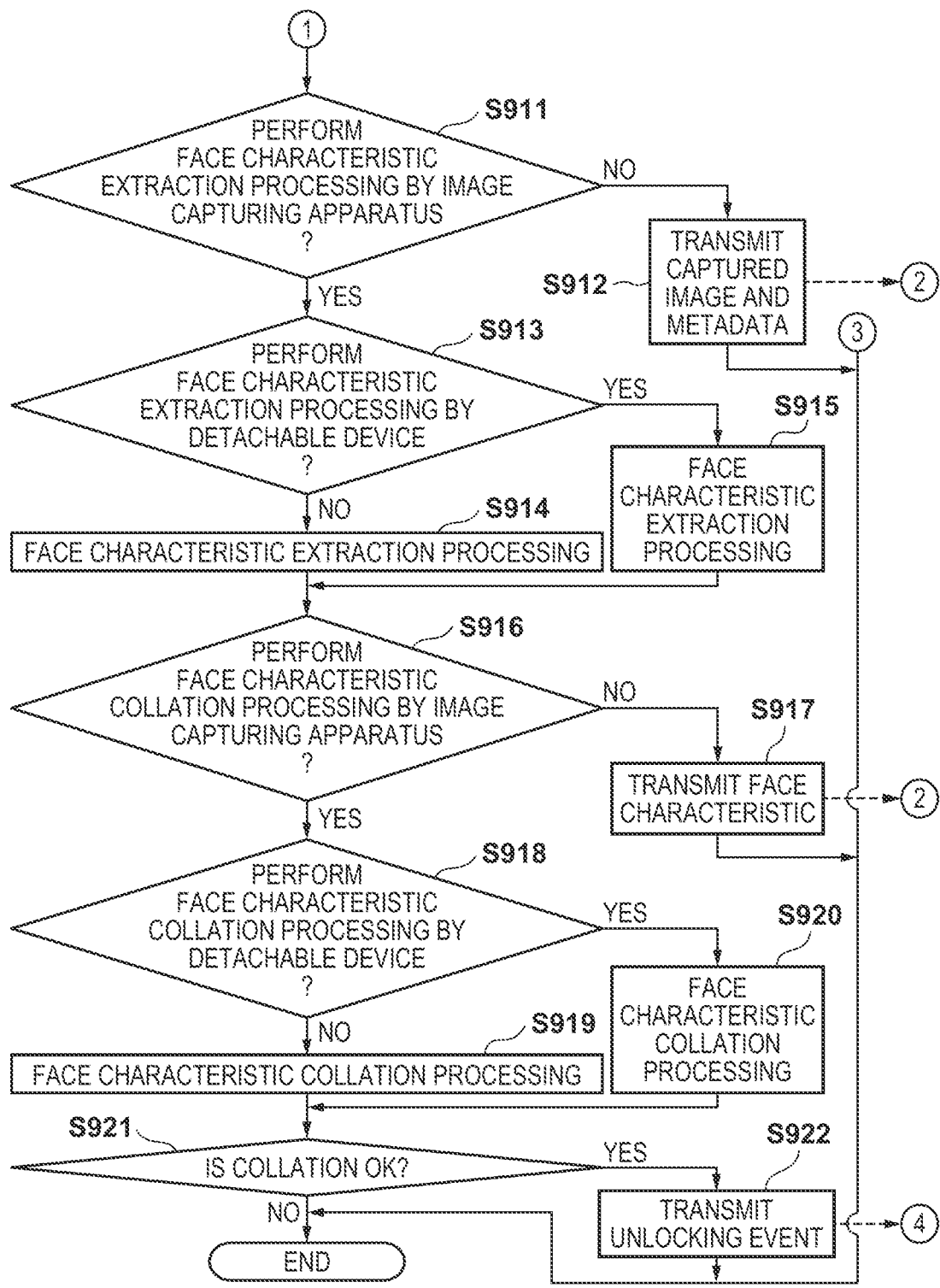
Figure 9C:
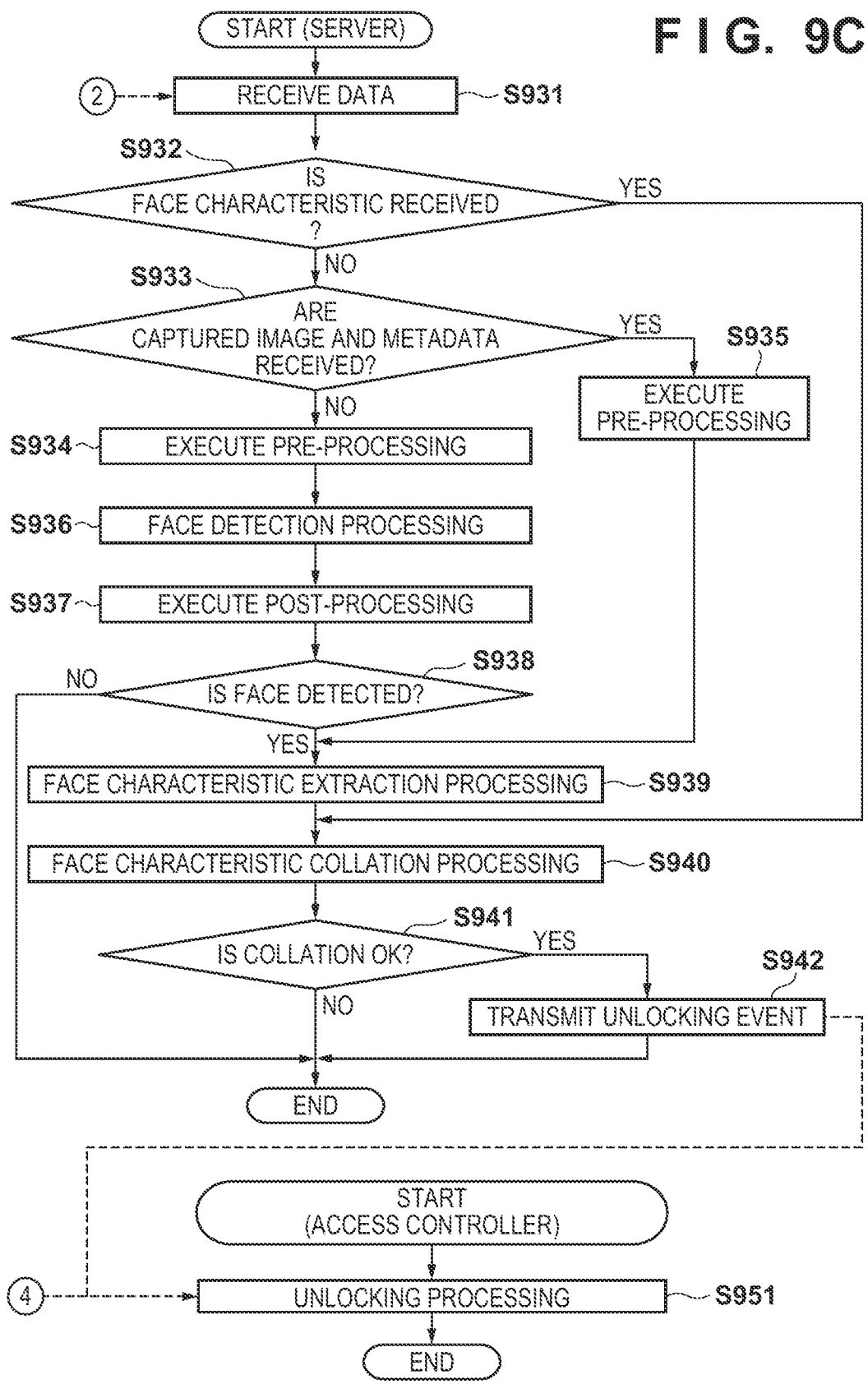

FIGS. 9A to 9C are flowcharts showing an example of the procedure of face authentication processing and electric lock unlocking processing (step S803). FIGS. 9A to 9C show processing of performing face authentication processing by the image capturing apparatus 110, the detachable device 100, and the server 130 for an image captured by the image capturing apparatus 110 and unlocking the electric lock 170.

Processes indicated by steps S901 to S907, S909 to S914, S916 to S919, and S920 to S922 are processes executed by the image capturing apparatus 110. Also, processes indicated by steps S908, S915, and S920 are processes executed by the detachable device 100. Furthermore, processes indicated by steps S931 to S942 are processes executed by the server 130. In addition, a process indicated by step S951 is a process executed by the access controller 150.

In step S901, the image capturing control unit 301 captures the peripheral environment. For example, the control unit 304 controls the signal processing unit 302 to process an image captured by the image capturing control unit 301, thereby obtaining a captured image.

In step S902, the control unit 304 judges which one of the image capturing apparatus 110, the detachable device 100, and the server 130 should execute each process of the face authentication function group. Details of the judgement method will be described later. In this embodiment, the detachable device 100 can execute the face detection processing 503, the face characteristic extraction processing 504, and the face characteristic collation processing 505. Also, the image capturing apparatus 110 can execute the pre-analysis processing 308, the face detection processing 309, the face characteristic extraction processing 310, the face characteristic collation processing 311, and the post-analysis processing 312. Furthermore, the server 130 can execute the pre-analysis processing 707, the face detection processing 708, the face characteristic extraction processing 709, the face characteristic collation processing 710, and the post-analysis processing 711.

In step S903, if face detection processing is to be locally executed (by the image capturing apparatus 110 or the detachable device 100), the control unit 304 advances to step S904. On the other hand, if face detection processing is to be remotely executed (by the server 130), the control unit 304 advances to step S905.

In step S904, the control unit 304 controls the analysis unit 305 to execute pre-analysis processing for the captured image input from the control unit 304, thereby obtaining the image of the pre-analysis processing result.

In step S905, the control unit 304 controls the network communication unit 307 to transmit the captured image obtained in step S901 to the server 130. As an example, the image capturing apparatus 110 transmits a response message to a request message defined by the above-described ONVIF standard to the server 130, thereby transmitting information to the server 130. However, the present invention is not limited to this, and information may be transmitted by another message.

In step S906, if face detection processing is to be executed by the image capturing apparatus 110, the control unit 304 advances to step S907. On the other hand, if face detection processing is to be executed by the detachable device, the control unit 304 advances to step S908.

In step S907, the control unit 304 controls the analysis unit 305 to execute the face detection processing 309 for the image of the pre-analysis processing result, thereby, obtaining a face likelihood and face position region information representing the region of the detected face.

In step S908, the analysis unit 501 executes the face detection processing 503 for the image of the pre-analysis processing result. On the other hand, in step S909, the control unit 304 controls the analysis unit 305 to execute the post-analysis processing 312, thereby creating metadata.

In step S910, the control unit 304 judges whether a face detection result exists in the metadata. If a face detection result exists, the process advances to step S908. If no face detection result exists, the procedure is ended.

In step S911, if face characteristic extraction processing is to be remotely executed (by the server 130), the control unit 304 advances to step S912. On the other hand, if face characteristic extraction processing is to be locally executed (by the image capturing apparatus 110 or the detachable device 100), the process advances to step S913.

In step S912, the control unit 304 controls the network communication unit 307 to transmit the captured image obtained in step S901 and the metadata created in step S909 to the server 130.

In step S913, if face characteristic extraction processing is to be executed by the image capturing apparatus 110, the control unit 304 advances to step S914. If face characteristic extraction processing is to be executed by the detachable device, the control unit 304 advances to step S915.

In step S914, the control unit 304 controls the analysis unit 305 to execute the face characteristic extraction processing 310 and to extract the face characteristic of the detected face. On the other hand, in step S915, the analysis unit 501 executes the face characteristic extraction processing 504 to extract the face characteristic of the detected face.

In step S916, if face characteristic collation processing is to be remotely executed (by the server 130), the control unit

304 advances to step S917. On the other hand, if face characteristic collation processing is to be locally executed (by the image capturing apparatus 110 or the detachable device 100), the control unit 304 advances to step S918.

In step S917, the control unit 304 controls the network communication unit 307 to transmit the face characteristic extracted in step S914 or S915 to the server 130.

In step S918, if face characteristic collation processing is to be executed by the image capturing apparatus 110, the control unit 304 advances to step S919. If face characteristic collation processing is to be executed by the detachable device, the control unit 304 advances to step S920.

In step S919, the control unit 304 controls the analysis unit 305 to execute the face characteristic collation processing 311. On the other hand, in step S920, the analysis unit 501 executes the face characteristic collation processing 311.

In step S921, if collation is OK as the result of the face characteristic collation processing, the control unit 304 advances to step S922. If collation is NG, the procedure is ended. In step S922, the control unit 304 controls the network communication unit 307 to transmit an unlocking event to the I/O module 140.

In step S931, the control unit 702 of the server 130 controls the network communication unit 701 to receive data from the image capturing apparatus 110. That is, the captured image (if it is transmitted in step S905), the captured image and the metadata (if these are transmitted in step S912), or the face characteristic (if it is transmitted in step S917) is received. In step S932, if the received data is the face characteristic, the control unit 702 advances to step S939. Otherwise, the control unit 702 advances to step S932. In step S933, if the received data are the captured image and the metadata, the control unit 702 advances to step S935. Otherwise (that is, if the received data is the captured image), the control unit 702 advances to step S934.

In step S934, the control unit 702 controls the analysis unit 705 to execute the pre-analysis processing 707 for the received captured image, thereby obtaining the image of the pre-analysis processing result. On the other hand, in step S935, the control unit 702 control the analysis unit 705 to execute the pre-analysis processing 707 for the received captured image, thereby obtaining the image of the pre-analysis processing result.

In step S936, the control unit 702 controls the analysis unit 705 to execute the face detection processing 708 for the image of the pre-analysis processing result. In step S937, the control unit 702 controls the analysis unit 705 to execute the post-analysis processing 711, thereby creating metadata. In step S938, the control unit 702 judges whether a face detection result exists in the metadata. If a face detection result exists, the process advances to step S939. If no face detection result exists, the procedure is ended.

In step S939, the control unit 702 controls the analysis unit 705 to execute the face characteristic extraction processing 709. In step S940, the control unit 702 controls the analysis unit 705 to execute the face characteristic collation processing 710, thereby obtaining the collation result.

In step S941, the control unit 702 judges whether the face likelihood exceeds a predetermined threshold. If the likelihood exceeds the threshold, collation is OK, and the process advances to step S942. If the likelihood does not exceed the threshold, collation is NG, and the procedure is ended. In step S942, the control unit 702 controls the network communication unit 701 to transmit an unlocking event to the I/O module 140.

In step S951, upon receiving the HTTP event (unlocking event) from the image capturing apparatus 110 or the server 130, the I/O module 140 transmits an electrical control signal to the access controller 150 via the electrical wire 180. Upon receiving the electrical control signal, the access controller 150 unlocks the electric lock 170.

(Procedure of Image Processing Execution Place Judgement Processing (Step S902))

FIGS. 10A and 10B are views showing examples of tables used for image processing execution place judgement processing. Note that, in the following explanation, an image processing capability means an index representing whether an apparatus can execute each image processing. On the other hand, a hardware capability means an index of the processing speed (speed) of each image processing.

A server table 1001 shows an image processing capability representing whether the server 130 can perform each image processing. The server table 1001 shows that the server 130 has a capability of performing the pre-analysis processing 707, the face detection processing 708, the face characteristic extraction processing 709, the face characteristic collation processing 710, and the post-analysis processing 711.

An image capturing apparatus table 1002 shows an image processing capability representing whether the image capturing apparatus 110 can perform each image processing. The image capturing apparatus table 1002 shows that the image capturing apparatus 110 has a capability of performing the pre-analysis processing 308, the face detection processing 309, the face characteristic extraction processing 310, the face characteristic collation processing 311, and the post-analysis processing 312.

A detachable device table 1003 shows an image processing capability representing whether the detachable device 100 can perform each image processing. The detachable device table 1003 shows that the detachable device 100 has a capability of performing the face detection processing 503, the face characteristic extraction processing 504, and the face characteristic collation processing 505.

Load state information 1004 shows the load state of the server 130. Processing of grasping the load state of the server is performed by the server load grasping unit 712. The load state of the server 130 includes, for example, a low load state 1005, a medium load state 1006, and a high load state 1007.

The low load state 1005 is a state in which the number of analysis processes simultaneously executed by the server 130 is zero or very low (less than a predetermined load), and the analysis processing speed of the server 130 for one analysis process is ideal. The medium load state 1006 is a state in which the server 130 simultaneously executes a plurality of analysis processes (equal to or more than a predetermined load), and the analysis processing speed is lower than in the ideal state. The high load state 1007 is a state in which the server 130 simultaneously executes a plurality of analysis processes (equal to or more than a predetermined load), and an analysis process exists in a queue. If an analysis request is issued in the high load state 1007, the process is accumulated in the queue, processing waits until processes accumulated in the queue in advance are ended, and the processing is executed after that.

The metrics for grasping the server load is not limited to this, and, for example, the server load may be calculated from an average analysis speed in a predetermined period. The server load may be calculated based on the number of connected cameras or a person passage state.

Hardware capability information 1008 represents the hardware capability of the image capturing apparatus 110.

The speed of performing each image processing is lower in a low-speed image capturing apparatus 1009 than in a high-speed image capturing apparatus 1010. To the contrary, the speed of performing each image processing is higher in the high-speed image capturing apparatus 1010 than in the low-speed image capturing apparatus 1009.

Hardware capability information 1011 represents the hardware capability of the detachable device 100. "Not inserted" 1012 represents a state in which image processing cannot be performed by the detachable device 100 because the detachable device 100 is not inserted into the image capturing apparatus. The speed of performing each image processing is lower in a low-speed detachable device 1013 than in a high-speed detachable device 1014. To the contrary, the speed of performing each image processing is higher in the high-speed detachable device 1014 than in the low-speed detachable device.

A judgment table 1015 is a table in which where to execute each image processing is described in accordance with the load state information 1004, the hardware capability information 1008, and the hardware capability information 1011. That is, the judgment table 1015 is a determination table for uniquely determining which one of the image capturing apparatus 110, the detachable device 100, and the server 130 should execute image processing. Note that the judgment table 1015 defines where to execute each image processing depending on at least the load state information 1004. Also, the judgment table 1015 may be dynamically configured based on the server table 1001, the image capturing apparatus table 1002, and the detachable device table 1003.

FIG. 11 is a flowchart showing an example of the procedure of image processing execution place judgement processing (step S902).

In step S1101, the control unit 304 of the image capturing apparatus 110 controls the network communication unit 701 to obtain the server table 1001 from the server 130. In step S1102, the control unit 304 obtains the image capturing apparatus table 1002. In step S1103, the control unit 304 obtains the detachable device table 1003. That is, the control unit 304 obtains image processing capability information of each of the server 130 and the image capturing apparatus 110 (capability obtaining).

Note that, in steps S1101 to S1103, the control unit 304 may confirm that inconsistency does not exist between the obtained tables and the judgment table 1015. That is, the control unit 304 may confirm that the judgment table 1015 does not include inexecutable analysis processing. If the judgment table 1015 includes inexecutable analysis processing, an error is output, and the processing is ended. Alternatively, the judgment table 1015 is corrected such that no inconsistency occurs.

In step S1104, the server load obtaining unit 313 controls the network communication unit 701 to issue a server load state obtaining request to the server 130. The server 130 controls the server load grasping unit 712 to perform server load grasping processing and responds to the image capturing apparatus 110 by the load state information 1004. Thus, the image capturing apparatus 110 obtains the load state information 1004 from the server 130.

In step S1105, the control unit 304 obtains the hardware capability information 1008 of the image capturing apparatus 110. In step S1106, the control unit 304 obtains the hardware capability information 1011 of the detachable device 100.

In step S1107, based on the obtained load state information 1004, hardware capability information 1008, and hardware capability information 1011, the image processing control unit 314 judges, in accordance with the judgment table 1015, the device that should execute each image processing. That is, it is judged which one of the image capturing apparatus 110, the detachable device 100, and the server 130 should perform each image processing of face authentication processing.

As described above, according to the first embodiment, in the image analysis system 101 including the image capturing apparatus 110, the detachable device 100, and the server 130, the apparatus (place) to execute processing is determined in accordance with at least the load state of the server 130. Also, the apparatus to execute processing is determined based on the image processing capability of each device or the hardware capability of each device in addition to the load state of the server. This can efficiently utilize the resource of the entire system and optimize the processing speed of the entire system.

Second Embodiment

In the second embodiment, processing of obtaining the information of the execution time of each process in a server 130, an image capturing apparatus 110, and a detachable device 100, and determining where to execute each process of a face authentication function group will be described. The system configuration, the configurations of the apparatuses (FIGS. 1 to 7B), and the overall processing procedure (FIG. 8) are the same as in the first embodiment, and a description thereof will be omitted. Parts different from the first embodiment will be described below.

<Procedure of Processing>
(Procedure of Image Processing Execution Place Judgement Processing (Step S902))

FIG. 12 is a view showing an example of the load/processing time of each device.

Load state information 1201 is the information of the load state of the server 130. Processing of grasping the load state information 1201 is performed by a server load grasping unit 712. The load state of the server 130 is represented by the sum of the execution times and the processing wait times of processes (here, pre-analysis processing 707, face detection processing 708, face characteristic extraction processing 709, face characteristic collation processing 710, and post-analysis processing 711). Note that the server load grasping unit 712 judges the load state of the server 130 based on, for example, the sum of the execution times and the processing wait times of the processes executed in the latest past.

Records 1202 to 1204 in the load state information 1201 show typical examples of execution times in the three load states, that is, "low load," "medium load," and "high load". A record 1205 shows an example of the number of waiting processes.

The record 1202 shows that, as the execution times, the pre-analysis processing 707 takes ten ms, the face detection processing 708 takes fifty ms, the face characteristic extraction processing 709 takes thirty ms, the face characteristic collation processing 710 takes twenty ms, and the post-analysis processing 711 takes five ms. Note that the processing wait time is assumed to be zero. The record 1203 shows that, as the execution times, the pre-analysis processing 707 takes twenty ms, the face detection processing 708 takes one hundred ms, the face characteristic extraction processing 709 takes sixty ms, the face characteristic collation processing 710 takes forty ms, and the post-analysis processing 711 takes ten ms. Note that the processing wait time is assumed to be zero.

The record 1204 shows that, as the execution times, the pre-analysis processing 707 takes thirty ms, the face detection processing 708 takes one hundred fifty ms, the face characteristic extraction processing 709 takes ninety ms, the face characteristic collation processing 710 takes sixty ms, and the post-analysis processing 711 takes fifteen ms. In addition, the record 1205 shows the number of waiting processes accumulated in the queue in the high load state. The high load processing wait time is calculated from the record 1204 and the record 1205.

Records 1207 and 1208 in image capturing apparatus information 1206 show typical examples of execution times corresponding to two processing performances, that is, "low speed" and "high speed".

The record 1207 shows that, as the execution times, pre-analysis processing 308 takes two hundred ms, face detection processing 309 takes five thousand ms, face characteristic extraction processing 310 takes three thousand ms, face characteristic collation processing 311 takes two thousand ms, and post-analysis processing 312 takes one hundred ms. The record 1208 shows that, as the execution times, the pre-analysis processing 308 takes twenty ms, the face detection processing 309 takes one thousand ms, the face characteristic extraction processing 310 takes six hundred ms, the face characteristic collation processing 311 takes four hundred ms, and the post-analysis processing 312 takes ten ms.

Records 1210 to 1212 in detachable device information 1209 show typical examples of execution times corresponding to three states, that is, "not inserted," "low speed," and "high speed". Note that, as shown in the record 1210, all the execution times in a case when the detachable device 100 is not inserted are indicated by X (representing that the detachable device is unusable).

The record 1211 shows that, as the execution times, face detection processing 503 takes two hundred ms, face characteristic extraction processing 504 takes one hundred twenty ms, and face characteristic collation processing 505 takes eighty ms. The record 1212 shows that, as the execution times, the face detection processing 503 takes one hundred ms, the face characteristic extraction processing 504 takes sixty ms, and the face characteristic collation processing 505 takes fourty ms.

FIG. 13 is a flowchart showing an example of the procedure of image processing execution place judgement processing (step S902) according to the second embodiment. The processing from step S1104 in the first embodiment (FIG. 11) is replaced with processing from step S1301.

In step S1301, the image capturing apparatus 110 obtains load state information from the server 130. In this processing, a control unit 304 of the image capturing apparatus 110 controls a network communication unit 701 to issue a server load state obtaining request to the server 130. The server 130 controls a server load grasping unit 712 to perform server load grasping processing and responds to the image capturing apparatus 110 by the load state information 1201. For example, if the server 130 is in a low load state, the pieces of information shown in the record 1202 are transmitted as the response.

In step S1302, the control unit 304 obtains the image capturing apparatus information of the image capturing apparatus 110. For example, the execution time of each process in the analysis unit 305 of the image capturing apparatus 110 is obtained as the image capturing apparatus information. For example, if the processing speed of the image capturing apparatus 110 is the low speed, the pieces of information shown in the record 1207 are transmitted as the response.

In step S1303, the control unit 304 obtains the detachable device information of the detachable device 100. For example, the execution time of each process in the detachable device 100 is obtained as the detachable device information. For example, if the processing speed of the detachable device 100 is the low speed, the pieces of information shown in the record 1211 are transmitted as the response.

In step S1304, based on the obtained load state information of the server 130, the image capturing apparatus information, and detachable device information, the control unit 304 judges the device that should execute each image processing. That is, the control unit 304 judges which one of the image capturing apparatus 110, the detachable device 100, and the server 130 should execute each image processing of face authentication processing. For example, a total execution time is calculated for each of a plurality of combinations of each image processing of the face authentication processing and the apparatus (place) to execute the image processing, and one combination with the shortest execution time (highest processing speed) is determined.

As described above, according to the second embodiment, in an image analysis system 101 including the image capturing apparatus 110, the detachable device 100, and the server 130, the execution time of each process in at least the server 130 is obtained. The apparatus (place) to execute processing is determined based on the obtained execution time of each process in the server 130. Also, the apparatus to execute processing is determined based on the image processing capability of each device or the execution time of each process in the image capturing apparatus 110 or the detachable device 100, in addition to the execution times in the server 130. This can efficiently utilize the resource of the entire system and optimize the processing speed of the entire system.

Third Embodiment

In the third embodiment, processing of obtaining accuracy information of each process in a server 130, an image capturing apparatus 110, and a detachable device 100 (accuracy obtaining), and determining where to execute each process of a face authentication function group will be described. Re-determination processing performed in accordance with the number of detected faces of face detection results will also be described. The system configuration, the configurations of the apparatuses (FIGS. 1 to 7B), and the overall processing procedure (FIG. 8) are the same as in the first and second embodiments, and a description thereof will be omitted. Parts different from the first and second embodiments will be described below.

<Procedure of Processing>

(Procedure of Face Authentication Processing and Electric Lock Unlocking Processing (Step S803))

FIG. 14 is a view showing an example of tables for defining the capability of each device according to the third embodiment. Tables 1401 to 1403 are used in place of the tables 1001 to 1003 shown in FIG. 10A of the first embodiment. Note that, in the following description, image processing accuracy means an index representing how accurately each image processing can be executed.

The server table 1401 shows the image processing capability and image processing accuracy in the server 130. The server table 1401 shows that the server 130 has a capability of performing pre-analysis processing 707, face detection processing 708, face characteristic extraction processing 709, face characteristic collation processing 710, and post-analysis processing 711. The server table 1401 also shows that the server 130 performs the face detection processing 708 at a high accuracy.

The image capturing apparatus table 1402 shows the image processing capability and image processing accuracy in the image capturing apparatus 110. The image capturing apparatus table 1402 shows that the image capturing apparatus 110 has a capability of performing pre-analysis processing 308, face detection processing 309, face characteristic extraction processing 310, face characteristic collation processing 311, and post-analysis processing 312. The image capturing apparatus table 1402 also shows that the image capturing apparatus 110 performs the face detection processing 309 at a low accuracy.

The detachable device table 1403 shows the image processing capability and the image processing accuracy in the detachable device 100. The detachable device table 1403 shows that the detachable device 100 has a capability of performing face detection processing 503, face characteristic extraction processing 504, and face characteristic collation processing 505. The detachable device table 1403 also shows that the detachable device 100 performs the face detection processing 503 at a medium accuracy.

Figure 15A:
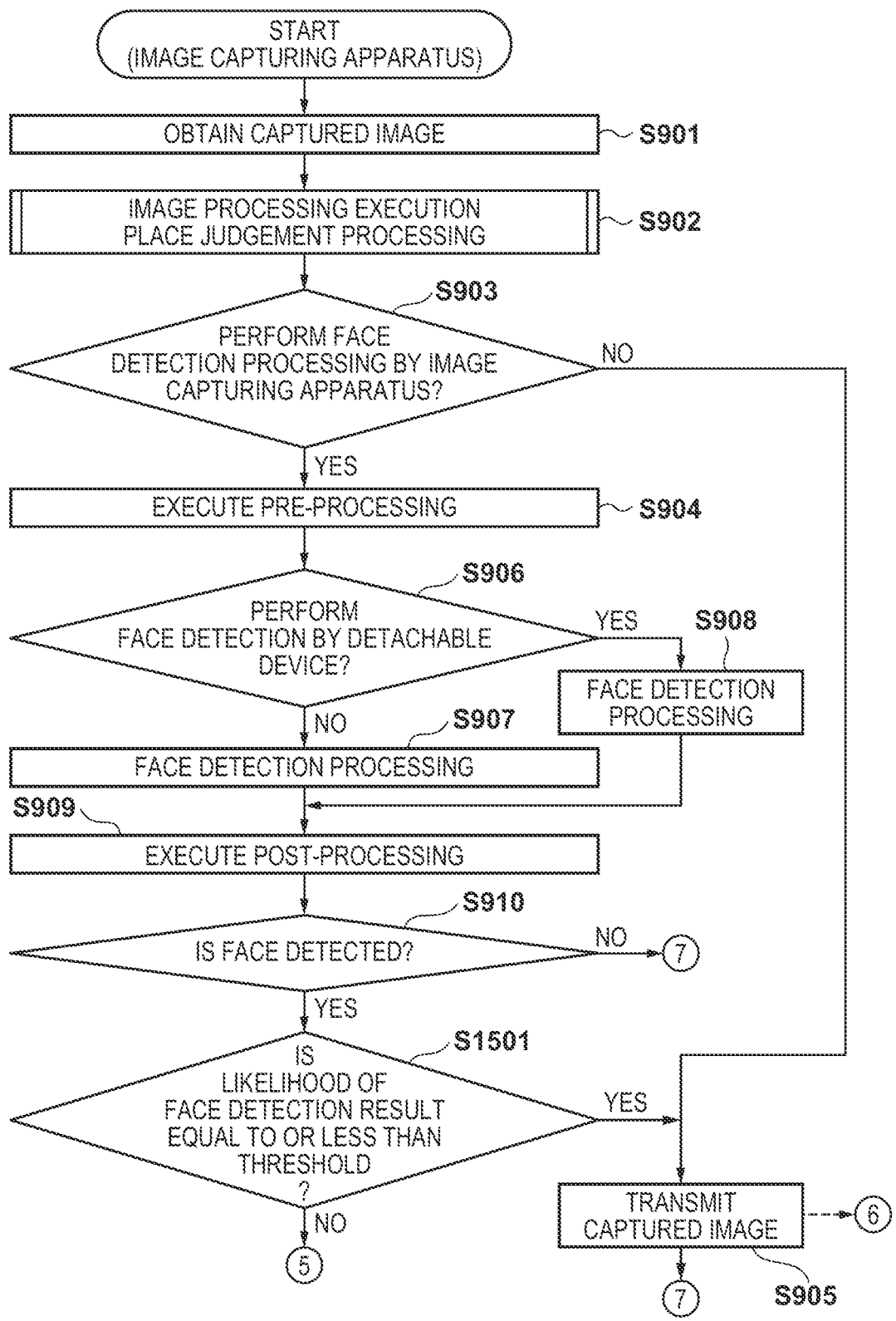
FIGS. 15A to 15C are flowcharts showing another example of the procedure of face authentication processing and electric lock unlocking processing.
Figure 15B:
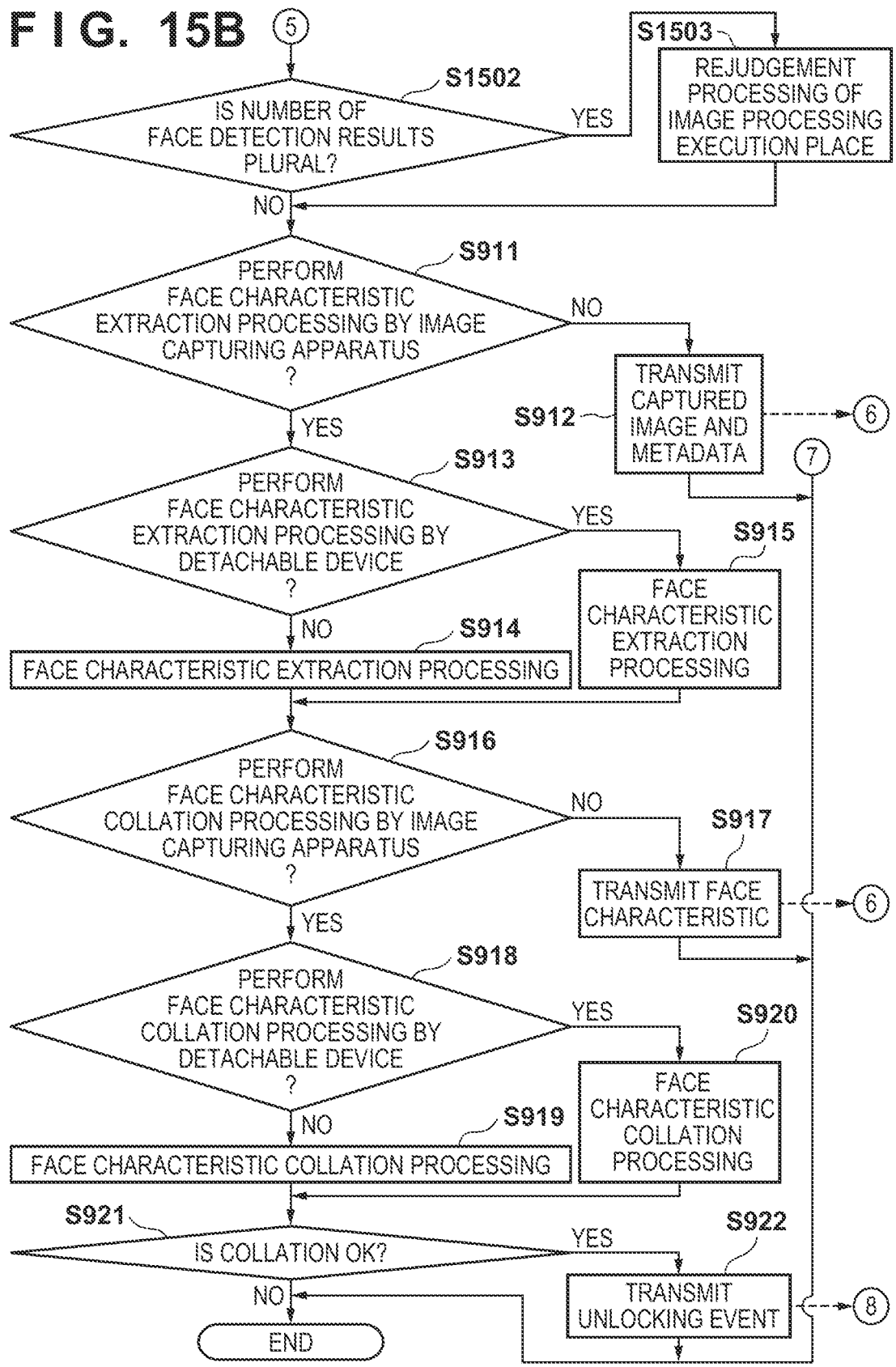
Figure 15C:
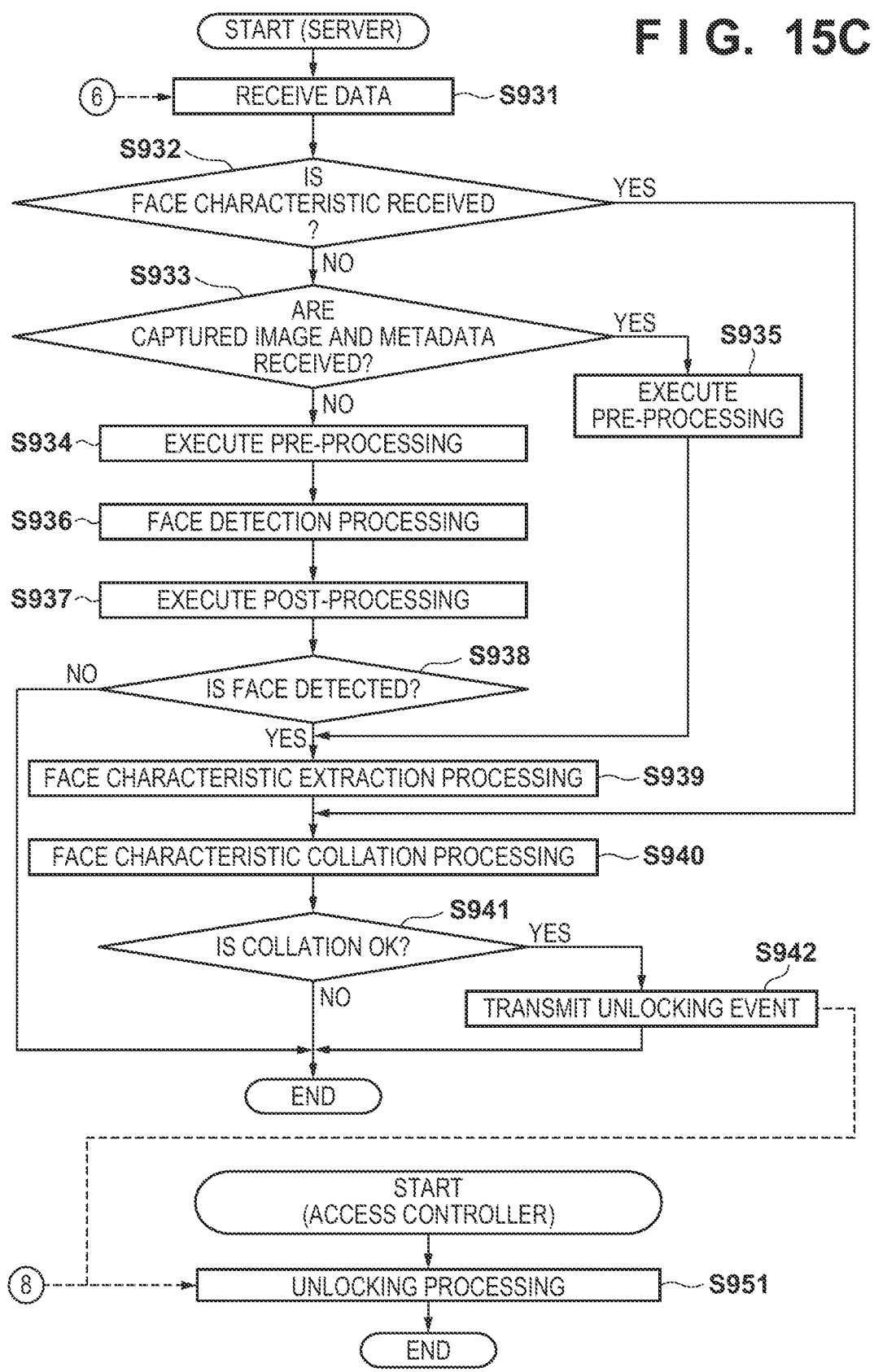

FIGS. 15A to 15C are flowcharts showing an example of the procedure of face authentication processing and electric lock unlocking processing (step S803) according to the third embodiment. Processes of steps S1501 to S1503 are added to the first embodiment (FIGS. 9A to 9C).

In step S1501, a control unit 304 of the image capturing apparatus 110 determines whether the likelihood of the face detection result in step S910 is equal to or less than a threshold. If the likelihood is equal to or less than the threshold, the process advances to step S905 to re-execute the face detection processing 708 in the server 130 capable of performing more accurate face detection. On the other hand, if the likelihood of the face detection result is more than the threshold, the process advances to step S1502.

In step S1502, the control unit 304 determines whether the number of detected faces of face detection results is plural. If the number of detected faces of face detection results is plural, the process advances to step S1503. On the other hand, if the number of detected faces of face detection results is not plural (i.e., one), the process advances to step S911.

In step S1503, an image processing control unit 314 determines to perform processing in the image processing execution place determined in step S902 for the first face detection result in the plurality of face detection results. On the other hand, for other face detection results (second and subsequent face detection results), the image processing execution place is rejudged (i.e., re-determined).

For example, if it is judged, in step S902, to perform face characteristic amount processing in the detachable device 100, face characteristic amount processing for the first face detection result is performed in the detachable device 100. For this reason, the number of waiting processes for the face characteristic amount processing in the detachable device 100 is one. Hence, if a plurality of faces are detected by face detection processing, for the subsequent processing for the second or subsequent face detection result, the image processing execution place is rejudged in consideration of the state of subsequent processing for the first face detection result.

As described above, according to the third embodiment, the apparatus (place) to execute processing is determined in consideration of image processing accuracy as well. This can optimize the entire system, including, not only the speed, but also the accuracy. In addition, if the number of detected faces of face detection results is plural, the image processing execution place is rejudged for the second and subsequent face detection results. This can more efficiently utilize the resource of the entire system.

Fourth Embodiment

In the fourth embodiment, a form in which image processing execution place judgement processing is performed by a server 130 will be described. The system configuration, the configurations of the apparatuses (FIGS. 1 to 7B), and the overall processing procedure (FIG. 8) are the same as in the first to third embodiments, and a description thereof will be omitted. Parts different from the first to third embodiments will be described below.

<Procedure of Processing>
(Procedure of Face Authentication Processing and Electric Lock Unlocking Processing (Step S803))

Figure 16A:
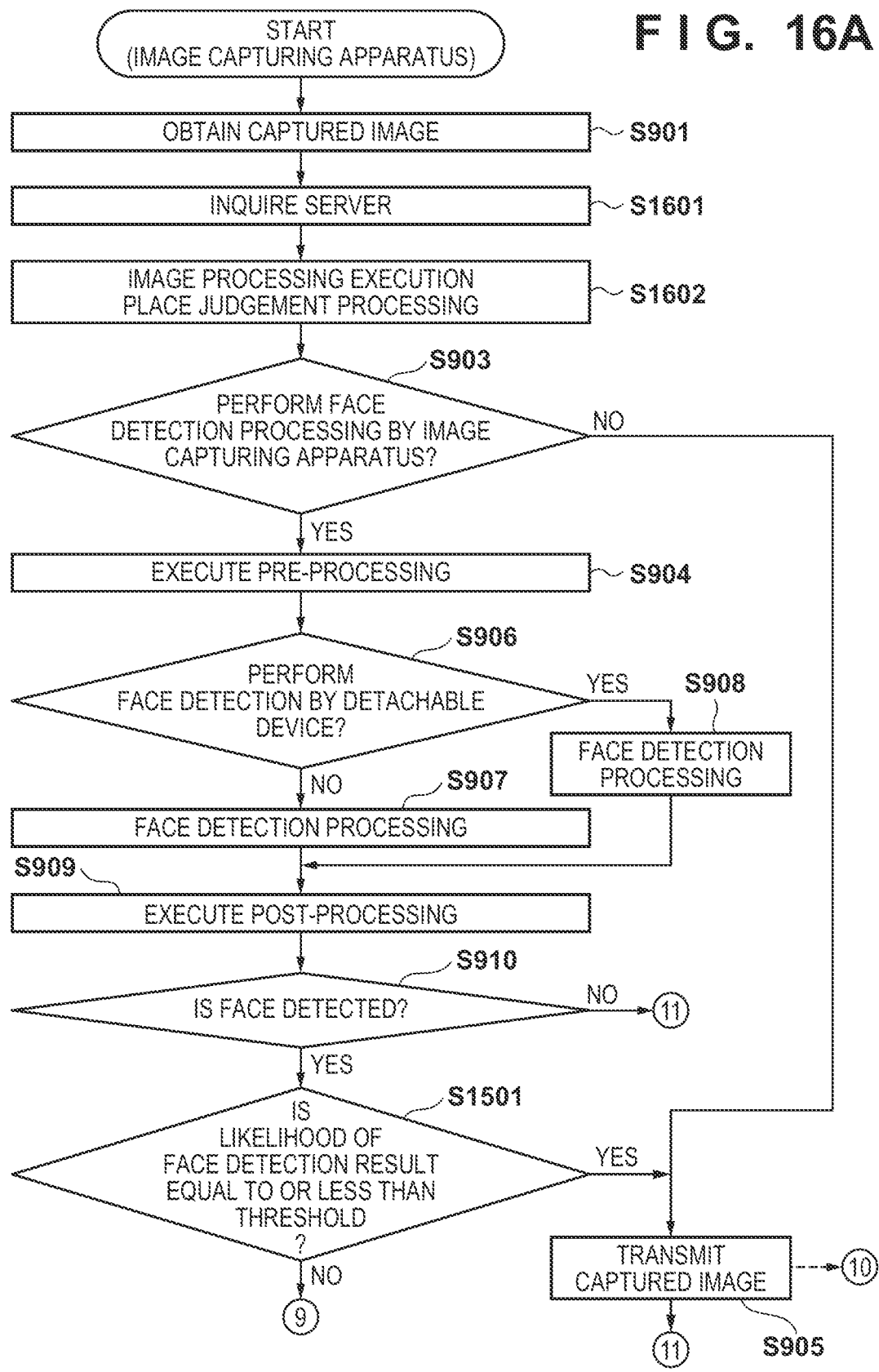
FIGS. 16A to 16C are flowcharts showing still another example of the procedure of face authentication processing and electric lock unlocking processing.
Figure 16B:
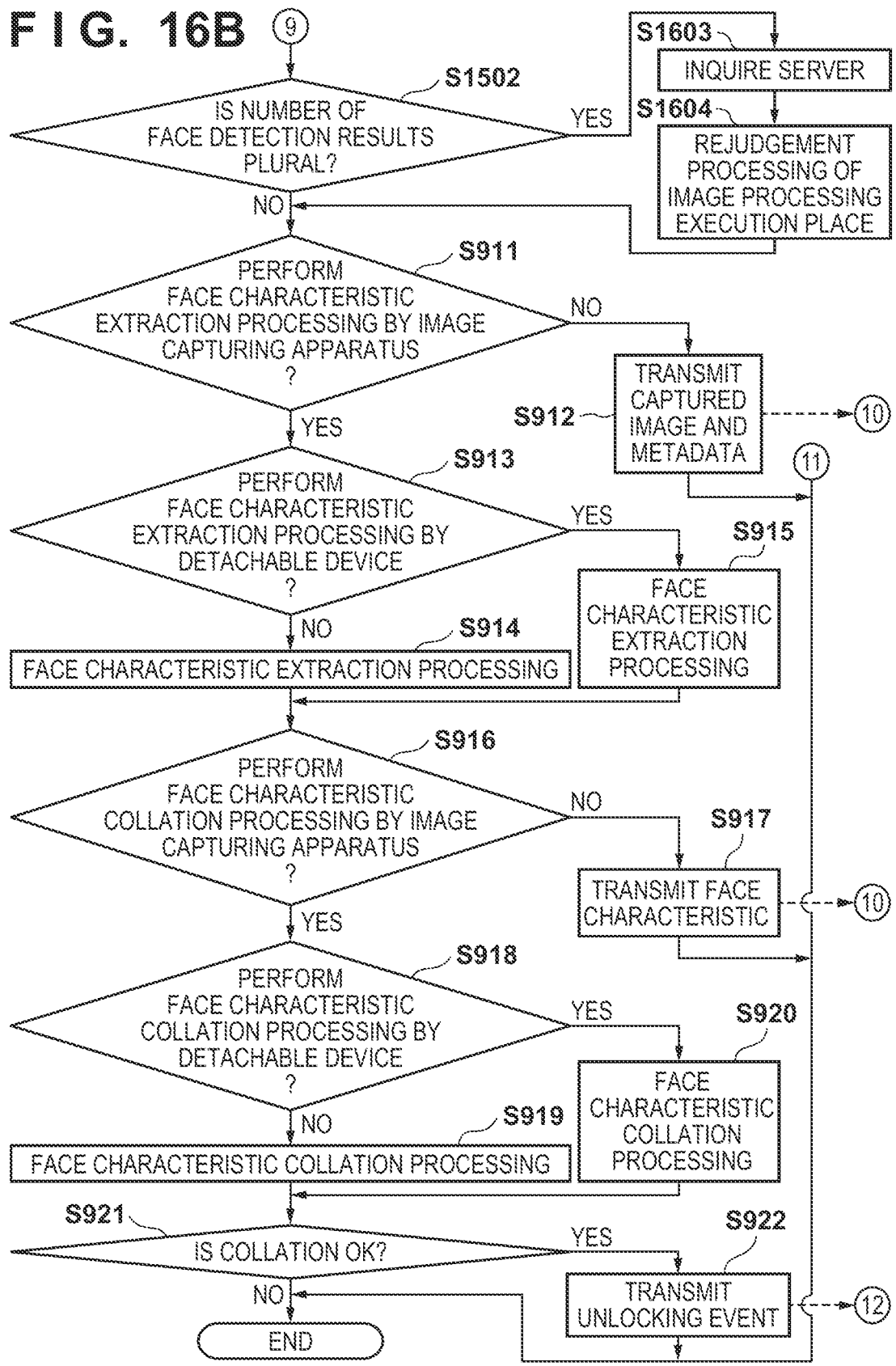
Figure 16C:
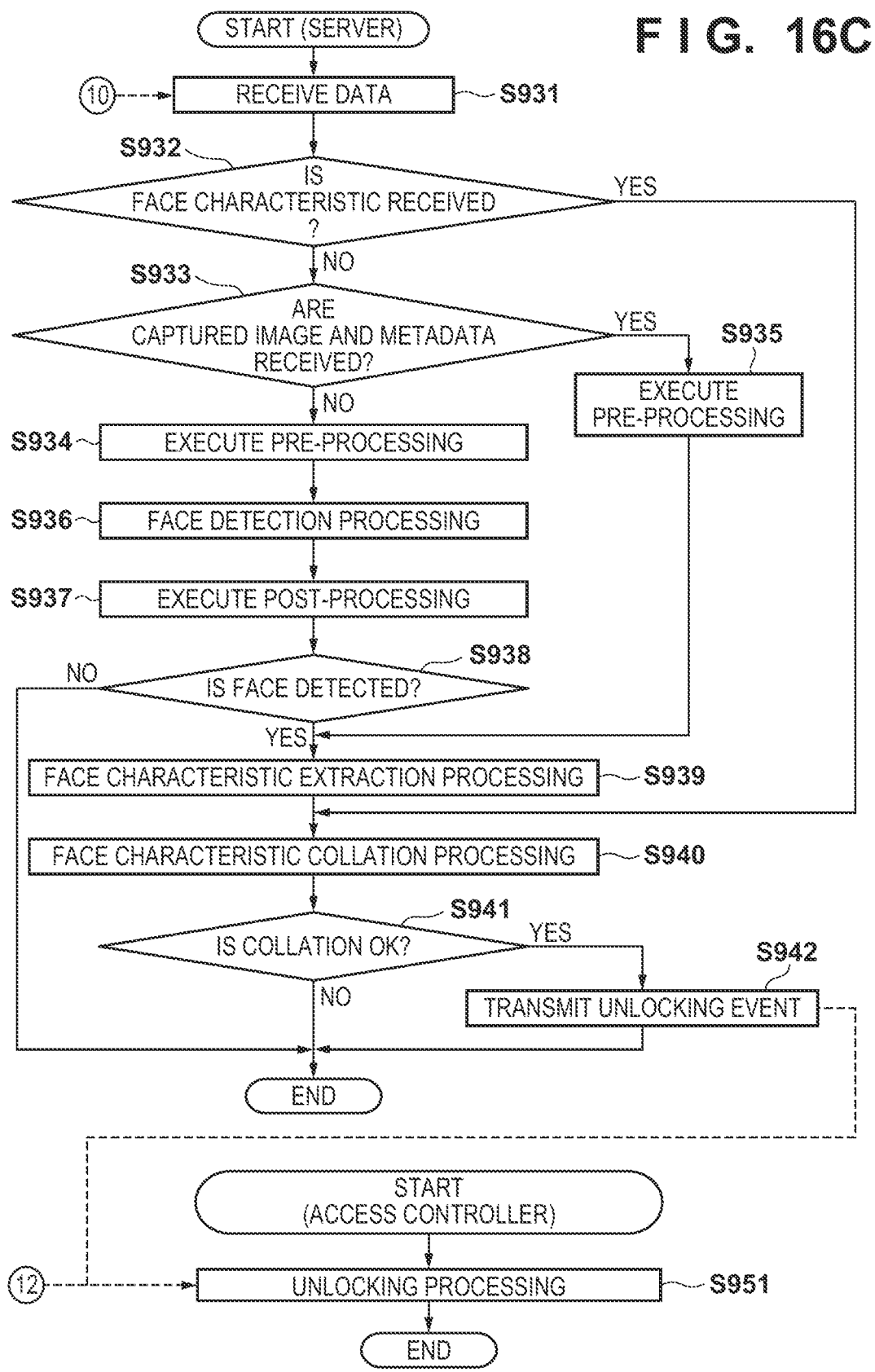

FIGS. 16A to 16C are flowcharts showing an example of the procedure of face authentication processing and electric lock unlocking processing (step S803) according to the fourth embodiment. As described above, the main difference is to perform image processing execution place judgement processing by the server 130. More specifically, steps S1601 to S1604 are added in place of steps S902 and S1503 in the third embodiment.

In step S1601, a control unit 304 of an image capturing apparatus 110 controls a network communication unit 701 to inquire the server 130 about the image processing execution place.

In step S1602, the server 130 controls a server load grasping unit 712 to perform server load grasping processing and judges the image processing execution place based on the states of image capturing apparatuses 110a to 110d and detachable devices 100a to 100d. That is, the image processing execution place is judged based on the information of the plurality of image capturing apparatuses (and detachable devices) existing in the system, unlike the first to third embodiments. The judgement result is then transmitted to the image capturing apparatus 110. Note that the contents of the image processing execution place judgement processing are the same as in the first to third embodiments, and a description thereof will be omitted.

In step S1603, the control unit 304 of the image capturing apparatus 110 controls the network communication unit 701 to inquire the server 130 about the image processing execution place again.

In step S1604, the server 130 controls the server load grasping unit 712 to perform server load grasping processing and rejudges the image processing execution place based on the states of the image capturing apparatuses 110a to 110d and the detachable devices 100a to 100d. The re-judgement result is then transmitted to the image capturing apparatus 110.

As described above, according to the fourth embodiment, image processing execution place judgement processing is performed by the server 130. This makes it possible to perform image processing execution place judgement processing based on the information of the plurality of image capturing apparatuses (and detachable devices) existing in the system. That is, it is possible to perform image processing execution place judgement processing corresponding to each of the image capturing apparatuses (and the detachable devices) while considering the balance of the entire system.

Other Embodiments

In the above-described embodiment, image analysis processing has been described as an example of analysis processing. However, the present invention is also applicable to audio analysis processing. For example, the present invention can be applied to processing of detecting an audio pattern such as a scream, a gunshot, or a glass breaking sound. For example, a characteristic amount of an audio is extracted by various audio data analysis methods such as spectrum analysis, and the extracted characteristic amount is compared with the detected audio pattern. By calculating the degree of matching, a specific audio pattern can be detected.

When performing audio analysis processing, audio data is divided into audio data of a predetermined time, audio analysis processing is performed using the audio data of the predetermined time as a unit. In addition, the predetermined time appropriately changes depending on the audio pattern of the detection target. For this reason, audio data of a time corresponding to an audio pattern to be detected is input to the detachable device 100. The detachable device 100 has a function of analyzing the input audio data or a function of holding the input audio data.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and need not have the function of non-temporarily storing the data. In other words, the detachable device 100 may be not assumed to be used to store data, like a normal SD card, and may have only the function of analysis processing.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capturing apparatus in which a detachable device to execute analysis processing for image data obtained by image capturing is mounted, the apparatus comprising:
    a processor; and
    a memory storing executable instructions that, when executed by the processor, cause the apparatus to perform operations including:
        communicating with an external processing apparatus capable of executing the analysis processing for the image data;
        obtaining load information concerning a load state in the external processing apparatus via the communicating; and
        determining, based on the load information, which one of the detachable device and the external processing apparatus is to be used to perform the analysis processing,
    wherein the load state indicates one of a low load state in which the load state in the external processing apparatus is less than a predetermined load, a medium load state in which the load state is not less than the predetermined load, but no waiting processing exists, and a high load state in which the load state is not less than the predetermined load, and waiting processing exists.

2. The apparatus according to claim 1, wherein the determining determines, based on the load information and a determination table that defines an apparatus to perform the analysis processing depending on at least the load state in the external processing apparatus, which one of the detachable device and the external processing apparatus is to be used to perform the analysis processing.

3. The apparatus according to claim 2, wherein the analysis processing is formed by a plurality of sub-processes, and wherein execution of the executable instructions causes the apparatus to perform further operations including:
    obtaining a first image processing capability representing which one of the plurality of sub-processes can be executed by the detachable device;
    obtaining a second image processing capability representing which one of the plurality of sub-processes can be executed by the external processing apparatus; and
    correcting the determination table based on the first image processing capability and the second image processing capability.

4. The apparatus according to claim 1, wherein the load state indicates a first execution time required by the external processing apparatus to perform the analysis processing, and wherein execution of the executable instructions causes the apparatus to perform further operations including:
    obtaining a second execution time required by the detachable device to perform the analysis processing; and
    determining, based on the first execution time and the second execution time, which one of the detachable device and the external processing apparatus is to be used to perform the analysis processing.

5. The apparatus according to claim 1, wherein execution of the executable instructions causes the apparatus to perform further operations including:
obtaining first accuracy information concerning processing accuracy of the analysis processing in the external processing apparatus;
obtaining second accuracy information concerning processing accuracy of the analysis processing in the detachable device; and
determining, based on the first accuracy information and the second accuracy information, which one of the detachable device and the external processing apparatus is to be used to perform the analysis processing.

6. The apparatus according to claim 1, wherein the analysis processing is face authentication processing formed by a plurality of sub-processes, and
wherein execution of the executable instructions causes the apparatus to perform further operations including determining which one of the detachable device and the external processing apparatus is to be used to perform each of the plurality of sub-processes.

7. The apparatus according to claim 6, wherein the plurality of sub-processes include face detection processing of detecting a face of a person included in the image data, and determining, based on the number of faces detected by the face detection processing, which one of the detachable device and the external processing apparatus is to be used to perform a sub-process following the face detection processing.

8. The apparatus according to claim 6, wherein the plurality of sub-processes include face detection processing of detecting a face of a person included in the image data, and determining, based on a likelihood of a face detection result by the face detection processing, which one of the detachable device and the external processing apparatus is to be used to perform a sub-process following the face detection processing.

9. The apparatus according to claim 1, wherein execution of the executable instructions causes the apparatus to perform further operations including determining which one of the detachable device, an internal processing device, and the external processing apparatus is to be used to perform the analysis processing.

10. A control method of controlling an image capturing apparatus in which a detachable device to execute analysis processing for image data obtained by image capturing is mounted, the image capturing apparatus including a processor and a memory storing executable instructions that, when executed by the processor, cause the apparatus to perform the control method, the method comprising:
communicating with an external processing apparatus capable of executing the analysis processing for the image data;
obtaining load information concerning a load state in the external processing apparatus via the communicating; and
determining, based on the load information, which one of the detachable device and the external processing apparatus is to be used to perform the analysis processing,
wherein the load state indicates one of a low load state in which the load state in the external processing apparatus is less than a predetermined load, a medium load state in which the load state is not less than the predetermined load, but no waiting processing exists, and a high load state in which the load state is not less than the predetermined load, and waiting processing exists.

11. A non-transitory computer-readable recording medium storing a program for causing a computer to execute a control method of controlling an image capturing apparatus in which a detachable device to execute analysis processing for image data obtained by image capturing is mounted, the image capturing apparatus including a processor and a memory storing executable instructions that, when executed by the processor, cause the apparatus to perform the control method, the method comprising:
communicating with an external processing apparatus capable of executing the analysis processing for the image data;
obtaining load information concerning a load state in the external processing apparatus via the communicating; and
determining, based on the load information, which one of the detachable device and the external processing apparatus is to be used to perform the analysis processing,
wherein the load state indicates one of a low load state in which the load state in the external processing apparatus is less than a predetermined load, a medium load state in which the load state is not less than the predetermined load, but no waiting processing exists, and a high load state in which the load state is not less than the predetermined load, and waiting processing exists.

* * * * *